United States Patent
McDonald

(10) Patent No.: US 7,143,269 B2
(45) Date of Patent: Nov. 28, 2006

(54) APPARATUS AND METHOD FOR KILLING AN INSTRUCTION AFTER LOADING THE INSTRUCTION INTO AN INSTRUCTION QUEUE IN A PIPELINED MICROPROCESSOR

(75) Inventor: Thomas McDonald, Austin, TX (US)

(73) Assignee: IP-First, LLC, Fremont, CA (US)

( * ) Notice: Subject to any disclaimer, the term of this patent is extended or adjusted under 35 U.S.C. 154(b) by 506 days.

(21) Appl. No.: 10/632,224

(22) Filed: Jul. 31, 2003

(65) Prior Publication Data

US 2004/0139301 A1 Jul. 15, 2004

Related U.S. Application Data

(60) Provisional application No. 60/440,063, filed on Jan. 14, 2003.

(51) Int. Cl.
G06F 9/30 (2006.01)
G06F 9/40 (2006.01)

(52) U.S. Cl. .................. 712/218; 712/214

(58) Field of Classification Search ............. 712/239, 712/218
See application file for complete search history.

(56) References Cited

U.S. PATENT DOCUMENTS

| | | | |
|---|---|---|---|
| 4,181,942 A | 1/1980 | Forster et al. | |
| 4,200,927 A | 4/1980 | Hughes et al. | |
| 4,860,197 A | 8/1989 | Langendorf et al. | |
| 5,142,634 A * | 8/1992 | Fite et al. | 712/240 |
| 5,163,140 A | 11/1992 | Stiles et al. | |
| 5,313,634 A | 5/1994 | Eickemeyer | |
| 5,353,421 A | 10/1994 | Emma et al. | |
| 5,355,459 A | 10/1994 | Matsuo et al. | |
| 5,394,530 A | 2/1995 | Kitta | |
| 5,404,467 A | 4/1995 | Saba et al. | |
| 5,434,985 A | 7/1995 | Emma et al. | |
| 5,513,330 A | 4/1996 | Stiles | |
| 5,530,825 A | 6/1996 | Black et al. | |
| 5,553,246 A | 9/1996 | Suzuki | |
| 5,604,877 A | 2/1997 | Hoyt et al. | |
| 5,623,614 A | 4/1997 | Van Dyke et al. | |
| 5,623,615 A | 4/1997 | Salem et al. | |
| 5,634,103 A | 5/1997 | Dietz et al. | |

(Continued)

OTHER PUBLICATIONS

The D Latch, Play-Hookey Web Page, Oct. 10, 1999.*

(Continued)

Primary Examiner—Fritz Fleming
Assistant Examiner—Jesse R Moll
(74) Attorney, Agent, or Firm—E. Alan Davis; James W. Huffman

(57) ABSTRACT

An apparatus for killing an instruction after it has already been loaded into an instruction queue of a microprocessor is disclosed. The apparatus includes control logic that detects a condition in which the instruction must not be executed, such as a branch instruction misprediction; however, the control logic determines the condition too late to prevent the instruction from being loaded into the instruction queue. The control logic generates a kill signal indicating the instruction must not be executed. A kill queue receives the kill signal and stores its value. The kill queue maintains its entries in parallel with the instruction queue entries so that when the instruction queue subsequently outputs the instruction, the kill queue also outputs the value of the kill signal associated with the, instruction. If the kill signal value output from the kill queue is true, then the microprocessor invalidates the instruction and does not execute it.

54 Claims, 11 Drawing Sheets

U.S. PATENT DOCUMENTS

| | | | |
|---|---|---|---|
| 5,687,349 A | 11/1997 | McGarity | |
| 5,687,360 A | 11/1997 | Chang | |
| 5,706,491 A | 1/1998 | McMahan | |
| 5,721,855 A | 2/1998 | Hinton et al. | |
| 5,734,881 A | 3/1998 | White et al. | |
| 5,752,069 A | 5/1998 | Roberts et al. | |
| 5,761,723 A * | 6/1998 | Black et al. | 711/144 |
| 5,768,576 A | 6/1998 | Hoyt et al. | |
| 5,805,877 A | 9/1998 | Black et al. | |
| 5,812,839 A | 9/1998 | Hoyt et al. | |
| 5,828,901 A | 10/1998 | O'Toole et al. | |
| 5,832,289 A | 11/1998 | Shaw et al. | |
| 5,850,532 A | 12/1998 | Narayan et al. | |
| 5,850,543 A | 12/1998 | Shiell et al. | |
| 5,864,707 A | 1/1999 | Tran et al. | |
| 5,867,701 A | 2/1999 | Brown et al. | |
| 5,881,260 A | 3/1999 | Raje et al. | |
| 5,881,265 A | 3/1999 | McFarland et al. | |
| 5,931,944 A | 8/1999 | Ginosar et al. | |
| 5,948,100 A | 9/1999 | Hsu et al. | |
| 5,961,629 A | 10/1999 | Nguyen et al. | |
| 5,964,868 A | 10/1999 | Gochman et al. | |
| 5,968,169 A | 10/1999 | Pickett | |
| 5,974,543 A | 10/1999 | Hilgendorf et al. | |
| 5,978,909 A | 11/1999 | Lempel | |
| 6,035,391 A | 3/2000 | Isaman | |
| 6,041,405 A * | 3/2000 | Green | 712/213 |
| 6,044,459 A | 3/2000 | Bae et al. | |
| 6,081,884 A | 6/2000 | Miller | |
| 6,085,311 A | 7/2000 | Narayan et al. | |
| 6,088,793 A | 7/2000 | Liu et al. | |
| 6,101,595 A | 8/2000 | Pickett et al. | |
| 6,108,773 A | 8/2000 | Col et al. | |
| 6,122,729 A | 9/2000 | Tran | |
| 6,134,654 A | 10/2000 | Patel et al. | |
| 6,151,671 A | 11/2000 | D'Sa et al. | |
| 6,157,988 A | 12/2000 | Dowling | |
| 6,170,054 B1 | 1/2001 | Poplingher | |
| 6,175,897 B1 | 1/2001 | Ryan et al. | |
| 6,185,676 B1 | 2/2001 | Poplingher et al. | |
| 6,233,676 B1 | 5/2001 | Henry et al. | |
| 6,250,821 B1 | 6/2001 | Schwendinger | |
| 6,256,727 B1 | 7/2001 | McDonald | |
| 6,260,138 B1 | 7/2001 | Harris | |
| 6,279,105 B1 | 8/2001 | Konigsburg et al. | |
| 6,279,106 B1 | 8/2001 | Roberts | |
| 6,308,259 B1 | 10/2001 | Witt | |
| 6,314,514 B1 | 11/2001 | McDonald | |
| 6,321,321 B1 | 11/2001 | Johnson | |
| 6,351,796 B1 | 2/2002 | McCormick et al. | |
| 6,374,350 B1 | 4/2002 | D'Sa et al. | |
| 6,457,120 B1 | 9/2002 | Sinharoy | |
| 6,502,185 B1 | 12/2002 | Keller et al. | |
| 6,560,696 B1 | 5/2003 | Hummel et al. | |
| 6,601,161 B1 | 7/2003 | Rappoport et al. | |
| 6,647,467 B1 | 11/2003 | Dowling | |
| 6,725,357 B1 * | 4/2004 | Cousin | 712/214 |
| 6,748,441 B1 | 6/2004 | Gemmell | |
| 6,754,808 B1 * | 6/2004 | Roth et al. | 712/218 |
| 6,823,444 B1 | 11/2004 | Henry et al. | |
| 6,886,093 B1 | 4/2005 | Henry | |
| 6,895,498 B1 | 5/2005 | McDonald et al. | |
| 6,898,699 B1 | 5/2005 | Jourdan et al. | |
| 6,968,444 B1 * | 11/2005 | Kroesche et al. | 712/208 |
| 2002/0188833 A1 | 12/2002 | Henry et al. | |
| 2002/0194460 A1 | 12/2002 | Henry et al. | |
| 2002/0194461 A1 | 12/2002 | Henry et al. | |
| 2002/0194464 A1 | 12/2002 | Henry et al. | |
| 2004/0030866 A1 | 2/2004 | McDonald | |
| 2004/0139281 A1 | 7/2004 | McDonald | |
| 2004/0139292 A1 | 7/2004 | McDonald | |
| 2004/0139301 A1 | 7/2004 | McDonald | |
| 2004/0143709 A1 | 7/2004 | McDonald | |
| 2004/0143727 A1 | 7/2004 | McDonald | |
| 2005/0044343 A1 | 2/2005 | Henry et al. | |
| 2005/0076193 A1 | 4/2005 | Henry et al. | |
| 2005/0114636 A1 | 5/2005 | McDonald et al. | |
| 2005/0132175 A1 | 6/2005 | Henry et al. | |
| 2005/0198479 A1 | 9/2005 | Bean et al. | |
| 2005/0198481 A1 | 9/2005 | Henry et al. | |

OTHER PUBLICATIONS

*Microprocessor Report*, vol. 9. No. 2. Feb. 16, 1995, p. 5.

*Microprocessor Report*. Aug. 23, 1999. p. 7.

Yeh et al. *Alternative Implementation of Two-Level Adaptive Branch Prediction*. 19th Annual International Symposium on Computer Architecture. pp. 124-134, May 19-21, 1992. Gold Coast, Australia.

Chang et al. *Alternative Implementations of Hybrid Branch Predictors*. Proceedings of MICRO-28. 1995. IEEE.

Mc Farling, Scott. *WRL Technical Note TN-36*. Combining Branch Predictors. Jun. 1993. Western Research Laboratory, 250 University Ave., Palo Alto, CA 94301.

Bray et al. *Strategies For Branch Target Buffers*. Technical Report No. CSL-TR-91-480. Jun. 1991.

Sakamoto et al. *Microarchitecture Support for Reducing Branch Penalty in a Superscaler Processor*. pp. 208-216. Mittsubishi Electric Corp. 4-1 Mizuhara, Itami, Hyogo 664. Japan, 1996. IEEE.

IEEE 100, The Authoritative Dictionary of IEEE Standard Terms, Seventh Edition. The Institute of Electrical Engineering, Inc. New York: Standards Information Network IEEE Press p. 135.

Online Computing Dictionary. http://instantweb.com/d/dictionary/foldoc.cgi?query=btb May 5, 1995. Branch Target Buffer.

Patterson et al. "Computer Organization & Design: The Hardware/Software Interface." Morgan Kaufmann Publishers, Inc. San Francisco, CA. 1998 p. 469.

Jimenez et al. "The Impact of Delay on the Design of Branch Predictors." 2000.

Eberly et al. "The Correlation Branch Target Address Cache" May 1996.

Patterson et al. "Computer Organization & Design: The Hardware/Software Interface." Morgan Kaufmann Publishers, Inc. San Francisco, CA. 1998 p. 453-455.

IBM Technical Disclosure Bulletin NN9204269, "Return Address Stack Cache." Apr. 1992, pp. 269-271.

* cited by examiner

Kill Instruction Apparatus Operation

APPARATUS AND METHOD FOR KILLING AN INSTRUCTION AFTER LOADING THE INSTRUCTION INTO AN INSTRUCTION QUEUE IN A PIPELINED MICROPROCESSOR

PRIORITY INFORMATION

This application claims priority based on U.S. Provisional Application, Ser. No. 60/440063, filed Jan. 14, 2003, entitled APPARATUS AND METHOD FOR KILLING INSTRUCTIONS DETERMINED INVALID AFTER INSTRUCTION FORMATTING IN A MICROPROCESSOR EMPLOYING A BRANCH TARGET ADDRESS CACHE IN AN EARLY PIPELINE STAGE.

FIELD OF THE INVENTION

This invention relates in general to the field of instruction buffering in microprocessors and particularly to killing instructions that have already been loaded into an instruction buffer.

BACKGROUND OF THE INVENTION

Modern microprocessors are pipelined microprocessors. That is, they operate on several instructions at the same time, within different blocks or pipeline stages of the microprocessor. Hennessy and Patterson define pipelining as, "an implementation technique whereby multiple instructions are overlapped in execution." Computer Architecture: A Quantitative Approach, $2^{nd}$ edition, by John L. Hennessy and David A. Patterson, Morgan Kaufmann Publishers, San Francisco, Calif., 1996. They go on to provide the following excellent illustration of pipelining:

A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe—instructions enter at one end, progress through the stages, and exit,at the other end, just as cars would in an assembly line.

Synchronous microprocessors operate according to clock cycles. Typically, an instruction passes from one stage of the microprocessor pipeline to another each clock cycle. In, an automobile assembly line, if the workers in one stage of the line are left standing idle because they do not have a car to work on, then the production, or performance, of the line is diminished. Similarly, if a microprocessor stage is idle during a clock cycle because it does not have an instruction to operate on—a situation commonly referred to as a pipeline bubble—then the performance of the processor is diminished.

One means commonly employed to avoid causing bubbles in the pipeline is to employ an instruction buffer, often arranged in a queue structure, between stages in the pipeline. An instruction buffer may provide elasticity for periods of time where the instruction processing rates vary between stages above and below the instruction buffer in the pipeline. For example, instruction buffering may be useful where execution stages of a pipeline (i.e., lower stages) require instructions to execute, but the instructions are not present in the instruction cache, which is in the upper portion of the pipeline. In this situation,, the impact of the missing cache line may be reduced to the extent an instruction buffer supplies instructions to the execution stages while the memory fetch is performed.

Another potential cause of pipeline bubbles is branch instructions. When a branch instruction is encountered, the processor must determine the target address of the branch instruction and begin fetching instructions at the target address rather than the next sequential address after the branch instruction. Furthermore, if the branch instruction is a conditional branch instruction (i.e., a branch that may be taken or not taken depending upon the presence or absence of a specified condition), the processor must decide whether the branch instruction will be taken, in addition to determining the target address. Because the pipeline stages that determine the target address and/or whether the branch instruction will be taken are typically well below the stages that fetch the instructions, bubbles may be created.

Although instruction buffering may reduce the number of bubbles, modern microprocessors also typically employ branch prediction mechanisms to predict the target address and/or whether the branch will be taken early in the pipeline to further reduce the problem. However, if the branch prediction turns out to be wrong, the instructions fetched as a result of the prediction, whether they were the next sequential instructions or the instructions at the target address, must not be executed by the processor or incorrect program execution will result.

Correcting for branch instruction mispredictions is one example of situations in which instructions fetched into a microprocessor must be killed, i.e., not executed by the pipeline. However, situations may exist in which the need to kill an instruction may not be determined until the instruction has already been written into an instruction buffer. Therefore, an efficient solution is needed for killing an instruction although it has already been written into an instruction buffer.

SUMMARY OF THE INVENTION

The present invention provides an apparatus for killing an instruction loaded into an instruction queue of a microprocessor during a first clock cycle and output from a bottom entry of the instruction queue during a second clock cycle subsequent to the first clock cycle. The apparatus includes a kill signal, for conveying a value generated during a third clock cycle subsequent to the first clock cycle. The apparatus also includes a kill queue, coupled to the kill signal, for loading the kill signal value generated during the third clock cycle, and for outputting the kill signal value during the second clock cycle. The apparatus also includes a load signal, coupled to the kill queue, which indicates during the second clock cycle whether the instruction was loaded into the bottom entry of the instruction queue during the first clock cycle. If the load signal is true, the third clock cycle and the second clock cycle are a same clock cycle. The apparatus also includes a valid signal, coupled to the kill queue, generated during the second clock cycle for indicating whether the instruction is to be executed by the microprocessor. The valid signal is false if the kill signal value output by the kill queue during the second clock cycle is true.

In another aspect, the present invention provides a method for killing an instruction in a microprocessor. The method includes loading an instruction into a first queue during a first clock cycle, generating a kill signal during a second clock cycle subsequent to the first clock cycle, and loading a value of the kill signal into a second queue during the second clock cycle. The method also includes determining whether the value in the second queue is true during a third clock cycle in which the instruction is output from a bottom entry of the first queue, and foregoing execution of the instruction if the value is true. The method also includes generating a load signal for indicating during the third clock cycle whether the instruction was loaded into a bottom entry of the first queue during the first clock cycle. If the load signal is true, the third clock cycle and the second clock cycle are a same clock cycle.

In another aspect, the present invention provides a program embodied on a computer readable medium, including computer-readable program code for providing an apparatus for killing an instruction loaded into an instruction queue of a microprocessor during a first clock cycle and output from a bottom entry of the instruction queue during a second clock cycle subsequent to the first clock cycle. The program code includes first program code for providing a kill signal, for conveying a value generated during a third clock cycle subsequent to the first clock cycle. The program code also includes second program code for providing a kill queue, coupled to the kill signal, for loading the kill signal value generated during the third clock cycle, and for outputting the kill signal value during the second clock cycle. The program code also includes third program code for providing a load signal, coupled to the kill queue, for indicating during the second clock cycle whether the instruction was loaded into the bottom entry of the instruction queue during the first clock cycle. If the load signal is true, the third clock cycle and the second clock cycle are a same clock cycle. The program code also includes fourth program code for providing a valid signal, coupled to the kill queue, generated during the second clock cycle for indicating whether the instruction is to be executed by the microprocessor. The valid signal is false if the kill signal value output by the kill queue during the second clock cycle is true.

In another aspect, the present invention provides an apparatus for killing an instruction loaded into an instruction queue of a microprocessor during a first clock cycle and output from a bottom entry of the instruction queue during a second clock cycle subsequent to the first clock cycle. The apparatus includes a kill signal, for conveying a value generated during a third clock cycle subsequent to the first clock cycle. The apparatus also includes a kill queue, coupled to the kill signal, for loading the kill signal value generated during the third clock cycle, and for outputting the kill signal value during the second clock cycle. The apparatus also includes a load signal, coupled to the kill queue, which indicates during the second clock cycle whether the instruction was loaded into the bottom entry of the instruction queue during the first clock cycle. If the load signal is false, the second clock cycle is subsequent to the third clock cycle. The apparatus also includes a valid signal, coupled to the kill queue, generated during the second clock cycle for indicating whether the instruction is to be executed by the microprocessor. The valid signal is false if the kill signal value output by the kill queue during the second clock cycle is true.

In another aspect, the present invention provides a method for killing an instruction in a microprocessor. The method includes loading an instruction into a first queue during a first clock cycle, generating a kill signal during a second clock cycle subsequent to the first clock cycle, and loading a value of the kill signal into a second queue during the second clock cycle. The method also includes determining whether the value in the second queue is true during a third clock cycle in which the instruction is output from a bottom entry of the first queue, and foregoing execution of the instruction if the value is true. The method also includes generating a load signal for indicating during the third clock cycle whether the instruction was loaded into a bottom entry of the first queue during the first clock cycle. If the load signal is false, the third clock cycle is subsequent to the second clock cycle.

In another aspect, the present invention provides a program embodied on a computer readable medium, including computer-readable program code for providing an apparatus for killing an instruction loaded into an instruction queue of a microprocessor during a first clock cycle and output from a bottom entry of the instruction queue during a second clock cycle subsequent to the first clock cycle. The program code includes first program code for providing a kill signal, for conveying a value generated during a third clock cycle subsequent to the first clock cycle. The program code also includes second program code for providing a kill queue, coupled to the kill signal, for loading the kill signal value generated during the third clock cycle, and for outputting the kill signal value during the second clock cycle. The program code also includes third program code for providing a load signal, coupled to the kill queue, for indicating during the second clock cycle whether the instruction was loaded into the bottom entry of the instruction queue during the first clock cycle. If the load signal is false, the second clock cycle is subsequent to the third clock cycle. The program code also includes fourth program code for providing a valid signal, coupled to the kill queue, generated during the second clock cycle for indicating whether the instruction is to be executed by the microprocessor. The valid signal is false if the kill signal value output by the kill queue during the second clock cycle is true.

An advantage of the present invention is that it enables proper program execution in a microprocessor pipeline that employs instruction queues and means requiring instruction killing, such as branch prediction mechanisms. Another advantage is that the present invention allows the kill signal to be generated late without adding additional pipeline stages to accommodate the instruction queue.

Other features and advantages of the present invention will become apparent upon study of the remaining portions of the specification and drawings.

DETAILED DESCRIPTION

Figure 1:
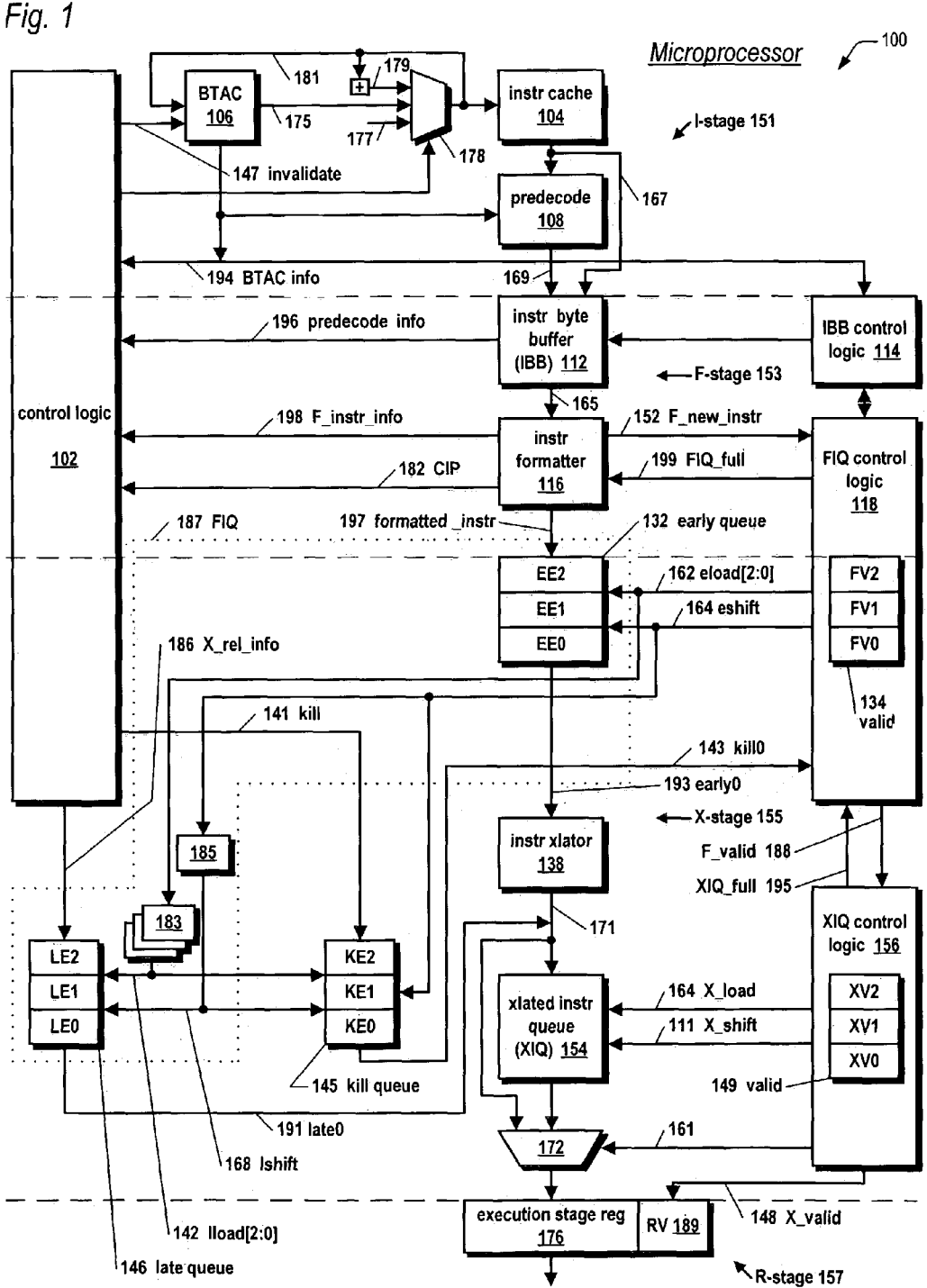
FIG. 1 is a block diagram of a microprocessor according to the present invention.

Referring now to FIG. 1, a block diagram of a microprocessor 100 according to the present invention is shown. Microprocessor 100 is a pipelined processor comprising multiple pipeline stages. A portion of the stages are shown, namely an I-stage 151, an F-stage 153, an X-stage 155, and an R-stage 157. I-stage 151 comprises a stage for fetching instruction bytes, either from memory or an instruction cache. In one embodiment, I-stage 151 includes a plurality of stages. F-stage 153 comprises a stage for formatting a stream of unformatted instruction bytes into formatted instructions. X-stage 155 comprises a stage for translating formatted macroinstructions into microinstructions. R-stage 157 comprises a register stage for loading operands from register files. Other execution stages of microprocessor 100 not shown, such as address generation, data, execute, store, and result write-back stages, follow R-stage 157.

Microprocessor 100 includes an instruction cache 104 in I-stage 151. Instruction cache 104 caches instructions fetched from a system memory coupled to microprocessor 100. Instruction cache 104 receives a current fetch address 181 for selecting a cache line of instruction bytes 167 to output. In one embodiment, instruction cache 104 is a multi-stage cache, i.e., instruction cache 104 requires multiple clock cycles to output a cache line in response to current fetch address 181.

Microprocessor 100 also includes a multiplexer 178 in I-stage 151. Multiplexer 178 provides current fetch address 181. Multiplexer 178 receives a next sequential fetch address 179, which is the current fetch address 181 incremented by the size of a cache line stored in instruction cache 104. Multiplexer 178 also receives a correction address 177, which specifies an address to which microprocessor 100 branches in order to correct a branch misprediction. Multiplexer 178 also receives a predicted branch target address 175.

Microprocessor 100 also includes a branch target address cache (BTAC) 106 in I-stage 151, coupled to multiplexer 178. BTAC 106 generates predicted branch target address 175 in response to current fetch address 181. BTAC 106 caches branch target addresses of executed branch instructions and the addresses of the branch instructions. In one embodiment, BTAC 106 comprises a 4-way set associative cache memory, and each way of a selected set contains multiple entries for storing a target address and branch prediction information for a predicted branch instruction. In addition to the predicted target address 175, BTAC 106 also outputs branch prediction related information 194. In one embodiment, the BTAC information 194 includes: an offset specifying the first byte of the predicted branch instruction within the instruction cache line selected by the current fetch address 181; an indication of whether the predicted branch instruction wraps across a half-cache line boundary; a valid bit for each entry in the selected way; an indication of which way in the selected set is least-recently-used; an indication of which of the multiple entries in the selected way is least-recently-used; and a prediction of whether the branch instruction will be taken or not taken.

Microprocessor 100 also includes control logic 102. If the current fetch address 181 matches a valid cached address in BTAC 106 of a previously executed branch instruction, and BTAC 106 predicts the branch instruction will be taken, then control logic 102 controls multiplexer 178 to select BTAC target address 175. If a branch misprediction occurs, control logic 102 controls multiplexer 178 to select correction address 177. Otherwise, control logic 102 controls multiplexer 178 to select next sequential fetch address 179. Control logic 102 also receives BTAC information 194.

Microprocessor 100 also includes predecode logic 108 in I-stage 151, coupled to instruction cache 104. Predecode logic 108 receives a cache line of instruction bytes 167 provided by instruction cache 104, and BTAC information 194, and generates predecode information 169 based thereon. In one embodiment, the predecode information 169 includes: a bit associated with each instruction byte predicting whether the byte is the opcode byte of a branch instruction predicted taken by BTAC 106; bits for predicting the length of the next instruction, based on the predicted instruction length; a bit associated with each instruction byte predicting whether the byte is a prefix byte of the instruction; and a prediction of the outcome of a branch instruction.

Microprocessor 100 also includes an instruction byte buffer 112 in F-stage 153, coupled to predecode logic 108. Instruction byte buffer 112 receives predecode information 169 from predecode logic 108 and instruction bytes 167 from instruction cache 104. Instruction byte buffer 112 provides the predecode information to control logic 102 via signal 196. In one embodiment, instruction byte buffer 112 is capable of buffering up to four cache lines of instruction bytes and associated predecode information.

Microprocessor 100 also includes instruction byte buffer control logic 114, coupled to instruction byte buffer 112. Instruction byte buffer control logic 114 controls the flow of instruction bytes and associated predecode information into and out of instruction byte buffer 112. Instruction byte buffer control logic 114 also receives BTAC info 194.

Microprocessor 100 also includes an instruction formatter 116 in F-stage 153, coupled to instruction byte buffer 112. Instruction formatter 116 receives instruction bytes and predecode information 165 from instruction byte buffer 112 and generates formatted instructions 197 therefrom. That is, instruction formatter 116 views a string of instruction bytes in instruction byte buffer 112, determines which of the bytes comprise the next instruction and the length of the next instruction, and outputs the next instruction as formatted_instr 197. In the embodiment of FIG. 1, instruction formatter 116 comprises combinatorial logic that views the, instruction bytes 165 from the instruction byte buffer 112 and outputs the formatted_instr 197 in the same clock cycle. In one embodiment, formatted instructions provided on formatted_instr 197 comprise instructions conforming substantially to the x86 architecture instruction set. In one embodiment, the formatted instructions are also referred to as macroinstructions that are translated into microinstructions that are executed by the execution stages of the microprocessor 100 pipeline. Formatted_instr 197 is generated in F-stage 153. Each time instruction formatter 116 outputs a formatted_instr 197, instruction formatter 116 generates a true value on a signal F_new_instr 152 to indicate the presence of a valid formatted instruction on formatted_instr 197. Additionally, instruction formatter 116 outputs information related to formatted_instr 197 on signal F_instr_info 198, which is provided to control logic 102. In one embodiment, F_instr_info 198 includes: a prediction, if the instruction is a branch instruction, of whether a branch instruction is taken or not taken; a prefix of the instruction; whether the address of the instruction hit in a branch target buffer of the microprocessor; whether the instruction is a far direct branch instruction; whether the instruction is a far indirect branch instruction; whether the instruction is a call branch instruction; whether the instruction is a return branch instruction; whether the instruction is a far return branch instruction; whether the instruction is an unconditional branch instruction; and whether the instruction is a conditional branch instruction. Furthermore, instruction formatter 116 outputs the address of the formatted instruction on current instruction pointer (CIP) signal 182, which is equal to the address of the previous instruction plus the length of the previous instruction.

Microprocessor 100 also includes a formatted, instruction queue (FIQ) 187 in X-stage 155. Formatted instruction queue 187 receives formatted_instr 197 from instruction formatter 116. Formatted instruction queue 187 also outputs a formatted instruction on an early0 signal 193. In addition, formatted instruction queue 187 receives from control logic 102 information related to the formatted instructions received on, formatted_instr 197 via a signal X_rel_info 186. X rel info 186 is generated in X-stage 155. Formatted instruction queue 187 also outputs on a late0 signal 191 information related to the formatted instruction which it outputs on early0 signal 193. Formatted instruction queue 187 and X_rel_info 186 will be described in more detail below.

Figure 2:
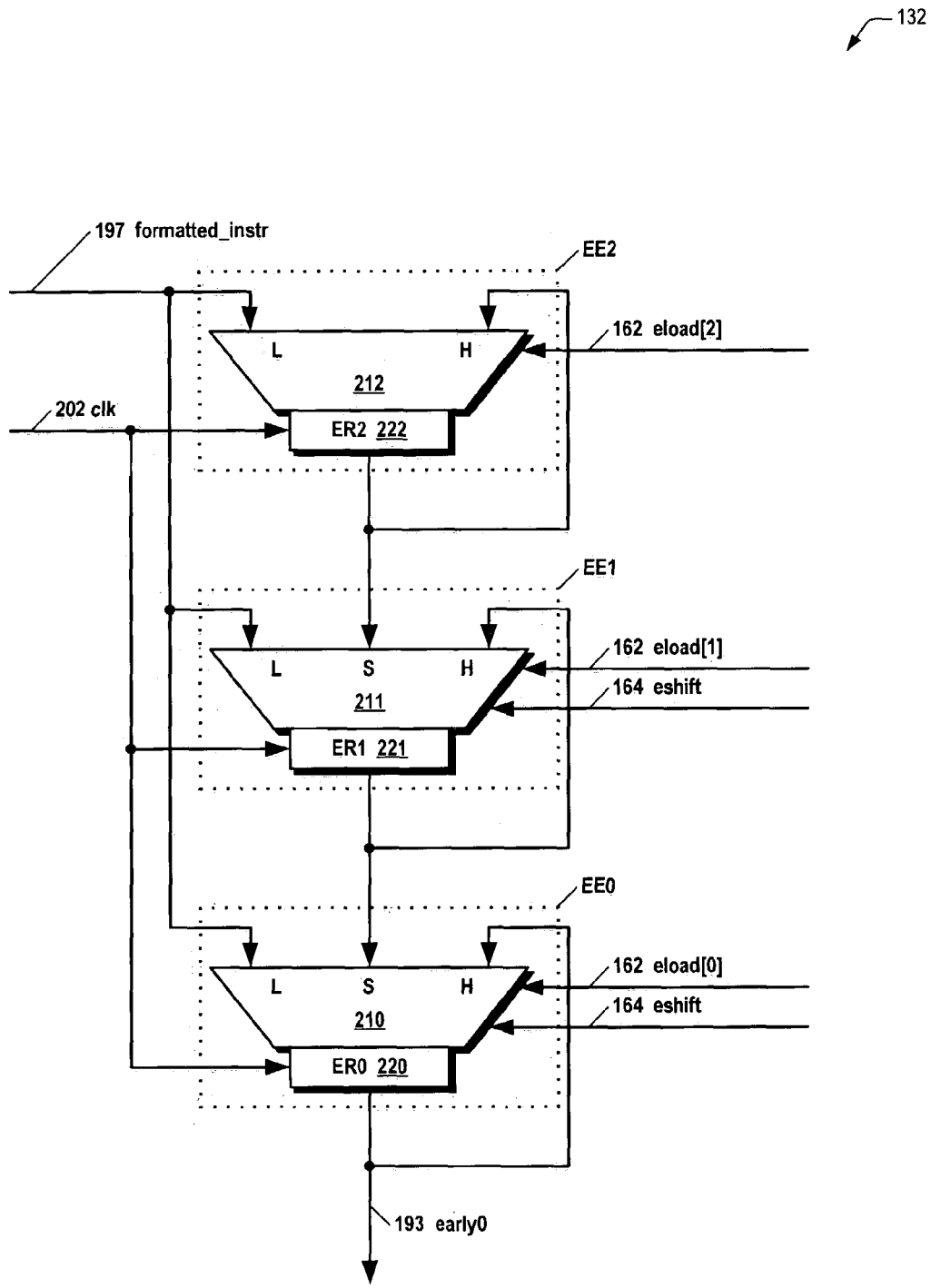
FIG. 2 is a block diagram illustrating the early queue of the formatted instruction queue of FIG. 1 according to the present invention.
Figure 3:
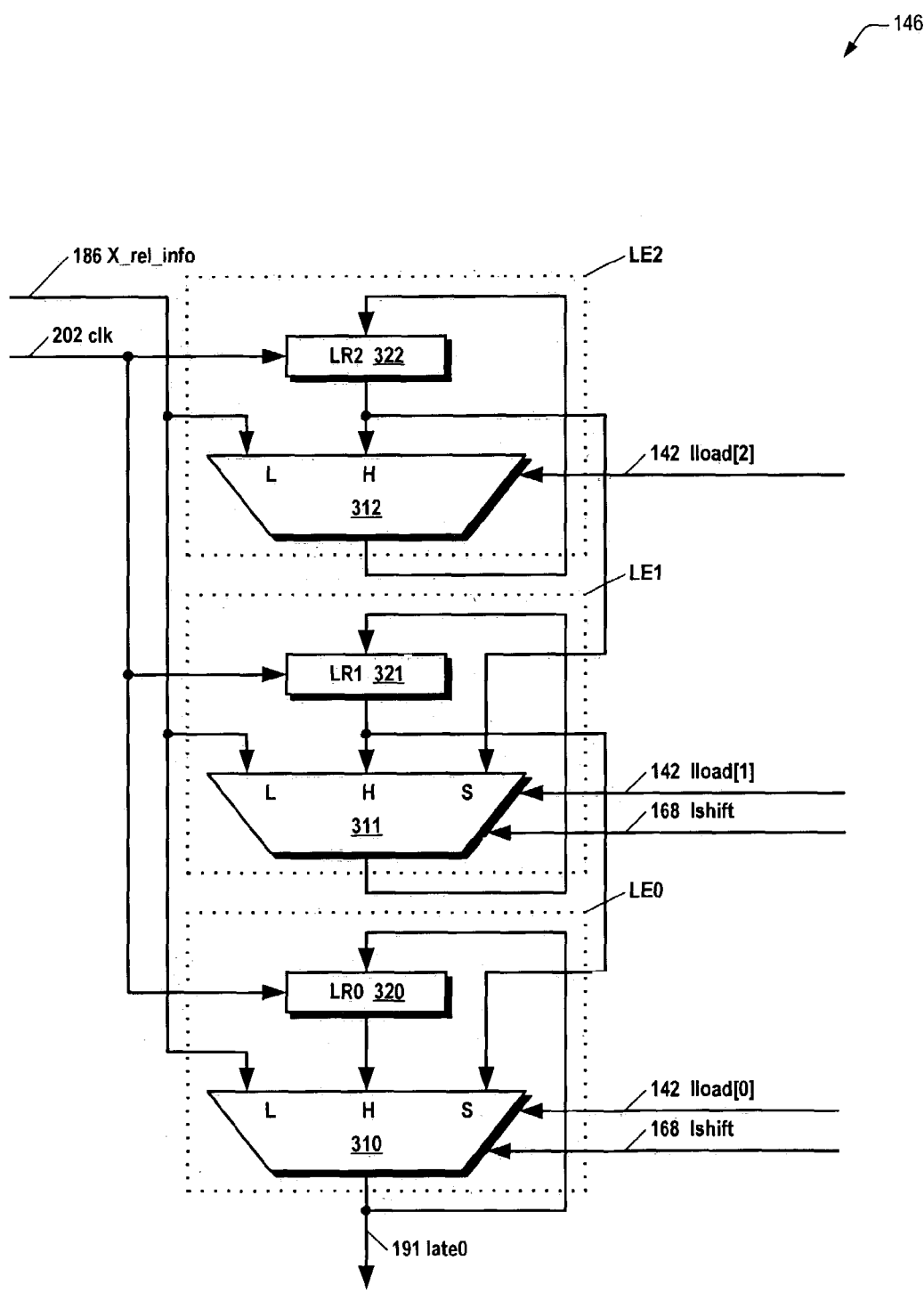
FIG. 3 is a block diagram illustrating the late queue of the formatted instruction queue of FIG. 1 according to the present invention.

Microprocessor 100 also includes formatted instruction queue (FIQ) control logic 118. FIQ control logic 118 receives F_new_instr 152 from instruction formatter 116. FIQ control logic 118 generates a true value on an FIQ_full signal 199, which is provided to instruction formatter 116, when formatted instruction queue 187 is full. FIQ control logic 118 also generates an eshift signal 164 for controlling shifting of instructions within formatted instruction queue 187. FIQ control logic 118 also generates a plurality of eload signals 162 for controlling loading an instruction from formatted_instr 197 into an empty entry of formatted instruction queue 187. In one embodiment, FIQ control logic 118 generates one eload signal 162 for each entry in formatted instruction queue 187. In one embodiment, formatted instruction queue 187 comprises 12 entries, each for storing a formatted macroinstruction. However, for simplicity and clarity, FIGS. 1 through 3 show formatted instruction queue 187 comprising three entries; hence, FIG. 1 shows three eload signals 162, denoted eload[2:0] 162.

FIQ control logic 118 also maintains a valid bit 134 for each entry in formatted instruction queue 187. The embodiment shown in FIG. 1 includes three valid bits 134 denoted, FV2, FV1, and FV0. FV0 134 corresponds to the valid bit for the lowest entry in formatted instruction queue 187; FV1 134 corresponds to the valid bit for the middle entry in formatted instruction queue 187; FV2 134 corresponds to the valid bit for the highest entry in formatted instruction queue 187. FIQ control logic 118 also outputs an F_valid signal 188, which is FV0 134 in one embodiment. Valid bits 134 indicate whether a corresponding entry in formatted instruction queue 187 contains a valid instruction. FIQ control logic 118 also receives an XIQ_full signal 195.

Microprocessor 100 also includes an instruction translator 138 in X-stage 155, coupled to formatted instruction queue 187. Instruction translator 138 receives a formatted instruction on early0 signal 193 from formatted instruction queue 187 and translates the formatted macroinstruction into one or more microinstructions 171. In one embodiment, microprocessor 100 includes a reduced instruction set computer (RISC) core that executes microinstructions of the native, or reduced, instruction set. In the embodiment of FIG. 1, instruction translator 138 comprises combinatorial logic that receives the formatted macroinstruction on early0 193 and outputs the translated microinstruction 171 in the same clock cycle. That is, instruction translator 138 translates whatever is presented to its inputs each clock cycle regardless of whether its inputs comprise a valid macroinstruction.

Microprocessor 100 also includes a translated instruction queue (XIQ) 154 in X-stage 155, coupled to instruction translator 138. XIQ 154 buffers translated microinstructions 171 received from instruction translator 138. XIQ 154 also buffers the related information received from formatted instruction queue 187 via late0 signal 191. The information received via late0 signal 191 is related to the microinstructions 171 because it is related to the formatted macroinstructions from which the microinstructions 171 were translated. The related information 191 is used by execution stages of microprocessor 100 to execute the related microinstructions 171. In one embodiment, XIQ 154 comprises four entries. In other embodiments, XIQ 154 comprises six and eight entries, respectively. However, for simplicity and clarity, XIQ 154 of FIG. 1 comprises only three entries.

Microprocessor 100 also includes XIQ control logic 156, coupled to XIQ 154. XIQ control logic 156 receives F_valid signal 188 and generates XIQ_full signal 195. XIQ control logic 156 also generates X_load signal 164 to control loading translated microinstructions 171 and related information 191 into XIQ 154. XIQ control logic 156 also generates X_shift signal 111 to control shifting microinstructions down in XIQ 154. XIQ control logic 156 also maintains a valid bit 149 for each entry in XIQ 154. The embodiment shown in FIG. 1 includes three valid bits 149 denoted, XV2, XV1, and XV0. XV0 149 corresponds to the valid bit for the lowest entry in XIQ 154; XV1 149 corresponds to the valid bit for the middle entry in XIQ 154; XV2 149 corresponds to the valid bit for the highest entry in XIQ 154. XIQ control logic 156 also outputs an X_valid signal 148, which is XV0 149 in one embodiment. Valid bits 149 indicate whether a corresponding entry in XIQ 154 contains a valid translated microinstruction.

Microprocessor 100 also includes a two-input multiplexer 172 in X-stage 155, coupled to XIQ 154. Multiplexer 172 operates as a bypass multiplexer to selectively bypass XIQ 154. Multiplexer 172 receives the output of XIQ 154 on one input. Multiplexer 172 receives the input to XIQ 154, i.e., microinstruction 171 and late0 191, on the other input. Multiplexer 172 selects one of its inputs to output to an execution stage register 176 in R-stage 157 based on a control input 161 generated by XIQ control logic 156. If execution stage register 176 is ready to receive an instruction and XIQ 154 is empty when instruction translator 138 outputs microinstruction 171, then XIQ control logic 156 controls multiplexer 172 to bypass XIQ 154. Microprocessor 100 also includes a valid bit register RV 189 that receives X_valid signal 148 from XIQ control logic 156 to indicate whether the microinstruction and related information stored in execution stage register 176 is valid.

Formatted instruction queue 187 comprises an early queue 132 for storing formatted macroinstructions received via formatted_instr signal 197 and a corresponding late queue 146 for storing related information received via X_rel_info signal 186. FIG. 1 shows early queue 132 comprising three entries, denoted EE2, EE1, and EE0. EE0 is the bottom entry of early queue 132, EE1 is the middle entry of early queue 132, and EE2 is the top entry of early queue 132. The contents of EE0 are provided on output signal early0 193. Signals eshift 164 and eload[2:0] 162 control the shifting and loading of early queue 132. Similarly, FIG. 1 shows late queue 146 comprising three entries, denoted LE2, LE1, and LE0. LE0 is the bottom entry of late queue 146, LE1 is the middle entry of late queue 146, and LE2 is the top entry of late queue 146. The contents of LE0 are provided on output signal late0 191.

Formatted instruction queue 187 also includes a register 185. Register 185 receives eshift signal 164 from FIQ control logic 118 at the end of a first clock cycle and on the next clock cycle outputs on an lshift signal 168 the value of eshift signal 164 received during the first clock cycle. Formatted instruction queue 187 also includes three registers 183. Registers 183 receive eload[2:0] signals 162 from FIQ control logic 118 at the end of a first clock cycle and on the next clock cycle output on lload[2:0] signals 142 the value of eload[2:0] signals 162 received during the first clock cycle. That is, registers 185 and 183 output a one-clock-cycle-delayed version of eshift signal 164 and eload[2:0] signals 162 respectively.

In one embodiment, X_rel_info 186 comprises: the length of the formatted macroinstruction from which the corresponding microinstruction was translated; an indication of whether the macroinstruction wrapped across a half-cache line boundary; a displacement field of the macroinstruction; an immediate field of the macroinstruction; the instruction pointer of the macroinstruction; and various information related to branch prediction and correction if the macroinstruction is predicted to be a branch instruction.

In one embodiment, the branch prediction and correction related information comprises: branch history table information used to predict whether the branch instruction will be taken or not taken; a portion of a linear instruction pointer of the branch instruction used to predict whether the branch instruction will be taken or not taken; a branch pattern exclusive-ORed with the linear instruction pointer to make the taken/not taken prediction; a second branch pattern for reverting to if the branch prediction is incorrect; various flags to indicate characteristics about the branch instruction, such as whether the branch instruction was a conditional branch Instruction, a call instruction, the target of a return stack, a relative branch, an indirect branch, and whether the prediction of the branch instruction outcome was made by a static predictor; various information related to the prediction made by the BTAC 106, such as whether the current fetch address 181 matched a cached address in the BTAC 106, whether the matching address was valid, whether the branch instruction was predicted taken or not taken, the least-recently-used way of the set of the BTAC 106 selected by the current fetch address 181, which way of the selected set to replace if execution of the instruction requires the BTAC 106 to be updated, and the target address output by the BTAC 106. In one embodiment, a portion of X_rel_info 186 is generated during prior clock cycles and stored for provision along with the related information generated during the clock cycle after the macroinstruction is provided from entry EE0 of early queue 132 on early0 signal 193.

Microprocessor 100 also includes a kill queue 145 in X-stage 155, coupled to FIQ control logic 118. Kill queue 145 stores a value of a kill signal 141 generated by control logic 102. Control logic 102 generates a true value on kill signal 141 to indicate that a macroinstruction provided on formatted_instr signal 197 to early queue 132 during the previous clock cycle must not be executed by microprocessor 100. Kill queue 145 includes a number of entries equal to the number of entries in formatted instruction queue 187. FIG. 1 shows kill queue 145 comprising three entries, denoted KE2, KE1, and KE0 to correspond with the three entries of formatted instruction queue 187 shown in FIG. 1. KE0 is the bottom entry of kill queue 145, KE1 is the middle entry of kill queue 145, and KE2 is the top entry of kill queue 145. The contents of KE0 are provided on output signal kill0 143, as described with respect to FIGS. 4, 5, and 6. Kill queue 145 receives lload[2:0] signals 142, lshift signal 168, and eshift signal 164 for controlling loading and shifting of kill queue 145. Kill queue 145 will be described below in more detail with respect to FIGS. 4, 5, and 6.

Control logic 102 generates a true value on kill signal 141 upon various conditions detected from BTAC information 194, predecode_info 196, F_instr_info 198, and current instruction pointer 182. One condition is detection that BTAC 106 has mispredicted a branch instruction. In one embodiment, BTAC 106 mispredicts a branch instruction by mispredicting a length of the branch instruction, i.e., the length predicted by BTAC 106 is different from the instruction length determined by instruction formatter 116. In one embodiment, BTAC 106 mispredicts a branch instruction by mispredicting that the instruction is a branch instruction, i.e., BTAC 106 predicted an instruction was a branch instruction, whereas instruction formatter 116 determines that the instruction at the predicted address is not a branch instruction. In one embodiment, BTAC 106 mispredicts a branch instruction by mispredicting the address of the branch instruction, i.e., the sum of the predicted instruction offset output by BTAC 106 and the fetch address 181 used by BTAC 106 to make the prediction does not match the instruction address 182 generated by instruction formatter 116.

In one embodiment, when BTAC 106 makes a misprediction, the mispredicted instruction and any instructions following it must be killed; hence, control logic 102 generates a true value on kill signal 141 for each of the instructions that must be killed. Control logic 102 generates kill signal 141 during the clock cycle after each of the instructions is provided to instruction formatter 116. In addition, control logic 102 provides information on an invalidate signal 147 to invalidate the entry in BTAC 106 that generated the misprediction. After control logic 102 has invalidated the mispredicting BTAC 106 entry, control logic 102 controls mux 178 to select correction address 177 to refetch the mispredicted instruction and subsequent instructions to correct for the misprediction. Since the mispredicting entry in BTAC 106 is now invalid, BTAC 106 will not predict the previously mispredicted instruction as a taken branch instruction; hence, the instruction, whether it is a branch instruction or not, will be formatted by instruction formatter 116, translated by instruction translator 138, and executed by the execution stages of the microprocessor pipeline 100.

Another condition in which control logic 102 generates a true value on kill signal 141 is in response to control logic 102 causing microprocessor 100 to branch to a target address generated by BTAC 106 in response to BTAC 106 predicting a branch instruction is taken. In this case, any instructions sequentially following the branch instruction that were fetched out of instruction cache 104 and placed into instruction byte buffer 112 must be killed; hence, control logic 102 generates a true value on kill signal 141 for each of the instructions that must be killed. Control logic 102 generates kill signal 141 during the clock cycle after each of the instructions is provided to instruction formatter 116. In one embodiment, instruction formatter 116 is capable of formatting two macroinstructions in the same clock cycle. If BTAC 106 predicts the first of the two instructions is a taken branch instruction, control logic 102 kills the second instruction.

Referring now to FIG. 2, a block diagram illustrating early queue 132 of formatted instruction queue 187 of FIG. 1 according to the present invention is shown. Early queue 132 includes three muxed-registers connected in series to form a queue. The three muxed registers comprise entries EE2, EE1, and EE0 of FIG. 1.

The top muxed-register in early queue 132 comprises a two-input mux 212 and a register 222, denoted ER2, that receives the output of mux 212. Mux 212 includes a load data input that receives formatted_instr signal 197 of FIG. 1. Mux 212 also includes a hold data input that receives the output of register ER2 222. Mux 212 receives eload[2] signal 162 of FIG. 1 as a control input. If eload[2] 162 is true, mux 212 selects formatted_instr signal 197 on the load data input; otherwise, mux 212 selects the output of register ER2 222 on the hold data input. Register ER2 222 loads the value of the output of mux 212 on the rising edge of a clock signal denoted clk 202.

The middle muxed-register in early queue 132 comprises a three-input mux 211 and a register 221, denoted ER1, that receives the output of mux 211. Mux 211 includes a load data input that receives formatted_instr signal 197. Mux 211 also includes a hold data input that receives the output of register ER1 221. Mux 211 also includes a shift data input that receives the output of register ER2 222. Mux 211 receives eload[1] signal 162 of FIG. 1 as a control input. Mux 211 also receives eshift signal 164 of FIG. 1 as a control input. If eload[1] 162 is true, mux 211 selects formatted_instr signal 197 on the load data input; or else if eshift signal 164 is true, mux 211 selects the output of register ER2 222 on the shift data input; otherwise, mux 211 selects the output of register ER1 221 on the hold data input. Register ER1 221 loads the value of the output of mux 211 on the rising edge of clk 202.

The bottom muxed-register in early queue 132 comprises a three-input mux 210 and a register 220, denoted ER0, that receives the output of mux 210. Mux 210 includes a load data input that receives formatted_instr signal 197. Mux 210 also includes a hold data input that receives the output of register ER0 220. Mux 210 also includes a shift data input that receives the output of register ER1 221. Mux 210 receives eload[0] signal 162 of FIG. 1 as a control input. Mux 210 also receives eshift signal 164 of FIG. 1 as a control input. If eload[0] 162 is true, mux 210 selects formatted_instr signal 197 on the load data input; or else if eshift signal 164 is true, mux 210 selects the output of register ER1 221 on the shift data input; otherwise, mux 210 selects the output of register ER0 220 on the hold data input. Register ER0 220 loads the value of the output of mux 210 on the rising edge of clk 202. The output of register ER0 220 is provided on early0 signal 193.

Referring now to FIG. 3, a block diagram illustrating late queue 146 of formatted instruction queue 187 of FIG. 1 according to the present invention is shown. Late queue 146 includes three registered-muxes connected in series to form a queue. The three registered-muxes comprise entries LE2, LE1, and LE0 of FIG. 1.

The top registered-mux in late queue 146 comprises a two-input mux 312 and a register 322, denoted LR2, that receives the output of mux 312. Mux 312 includes a load data input that receives X_rel_info 186 of FIG. 1. Mux 312 also includes a hold data input that receives the output of register LR2 322. Mux 312 receives lload[2] signal 142 of FIG. 1 as a control input. If lload[2] 142 is true, mux 312 selects X_rel_info 186 on the load data input; otherwise, mux 312 selects the output of register LR2 322 on the hold data input. Register LR2 322 loads the value of the output of mux 312 on the rising edge of clk 202 of FIG. 2.

The middle registered-mux in late, queue 146 comprises a three-input mux 311 and a register 321, denoted LR1, that receives the output of mux 311. Mux 311 includes a load data input that receives X_rel_info 186. Mux 311 also includes a hold data input that receives the output of register LR1 321. Mux 311 also includes a shift data input that receives the output of register LR2 322. Mux 311 receives lload[1] signal 142 of FIG. 1 as a control input. If lload[1] 142 is true, mux 311 selects X_rel_info 186 on the load data input; or else if lshift 168 is true, mux 311 selects the output of register LR2 322; otherwise, mux 311 selects the output of register LR1 321 on the hold data input. Register LR1 321 loads the value of the output of mux 311 on the rising edge of clk 202 of FIG. 2.

The bottom registered-mux in late queue 146 comprises a three-input mux 310 and a register 320, denoted LR0, that receives the output of mux 310. Mux 310 includes a load data input that receives X_rel_info 186. Mux 310 also includes a hold data input that receives the output of register LR0 320. Mux 310 also includes a shift data input that receives the output of register LR1 321. Mux 310 receives lload[0] signal 142 of FIG. 1 as a control input. If lload[0] 142 is true, mux 310 selects X_rel_info 186 on the load data input; or else if lshift 168 is true, mux 310 selects the output of register LR1 321; otherwise, mux 310 selects the output of register LR0 320 on the hold data input. Register LR0 320 loads the value of the output of mux 310 on the rising edge of clk 202 of FIG. 2. The output of mux 310 is provided on late0 signal 291 of FIG. 1.

Figure 4:
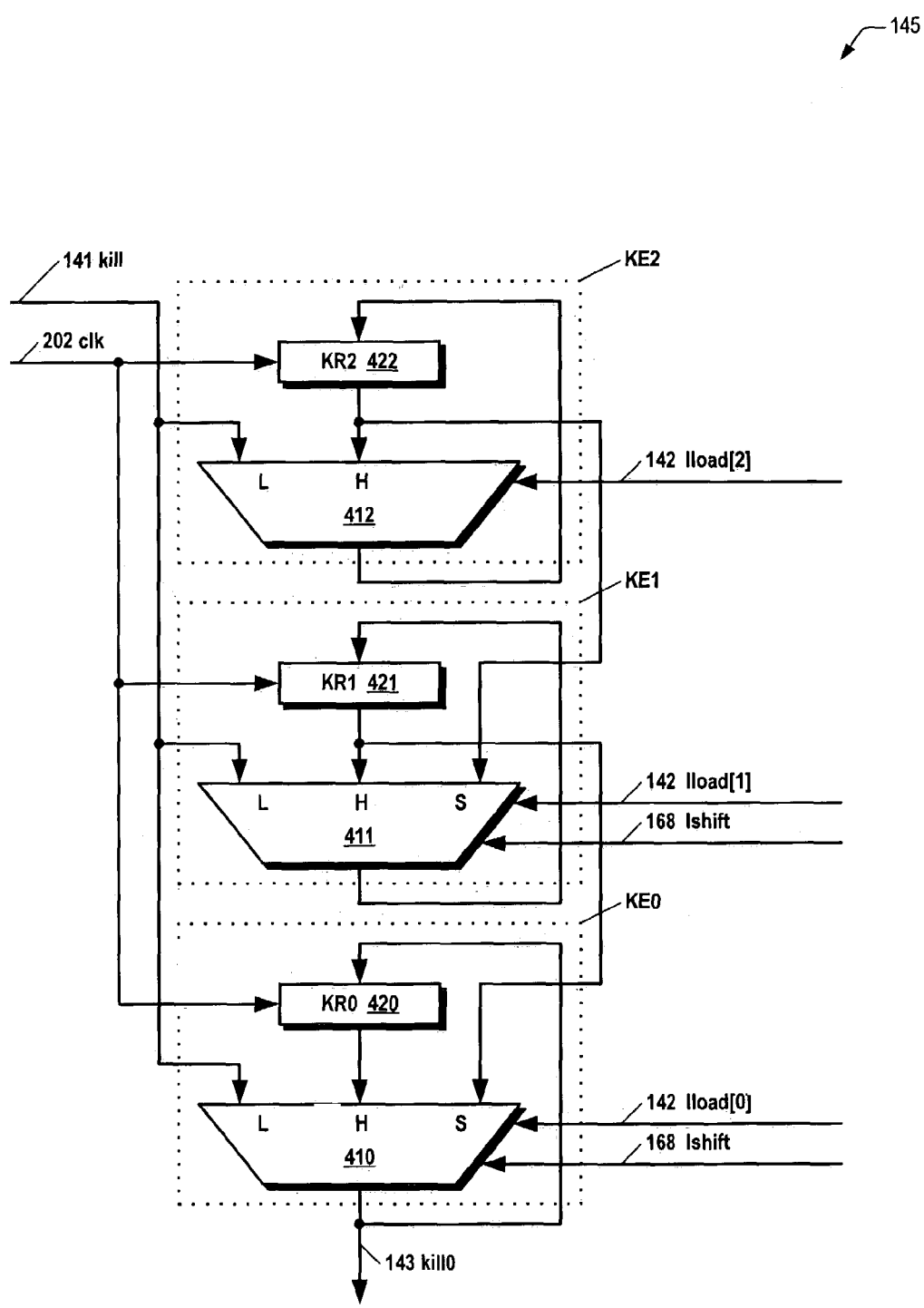
FIG. 4 is a block diagram illustrating a first embodiment of the kill queue of FIG. 1 according to the present invention.

Referring now to FIG. 4, a block diagram illustrating a first embodiment of kill queue 145 of FIG. 1 according to the present invention is shown. The structure of the embodiment of kill queue 145 of FIG. 4 is similar to the structure of lateQ 146 of FIG. 3. Kill queue 145 includes three registered-muxes connected in series to form a queue. The three registered-muxes comprise entries KE2, KE1, and KE0 of FIG. 1.

The top registered-mux in kill queue 145 comprises a two-input mux 412 and a register 422, denoted KR2, that receives the output of mux 412. Mux 412 includes a load data input that receives kill signal 141 of FIG. 1. Mux 412 also includes a hold data input that receives the output of register KR2 422. Mux 412 receives lload[2] signal 142 of FIG. 1 as a control input. If lload[2] 142 is true, mux 412 selects kill signal 141 on the load data input; otherwise, mux 412 selects the output of register KR2 422 on the hold data input. Register KR2 422 loads the value of the output of mux 412 on the rising edge of clk 202 of FIG. 2.

The middle registered-mux, in kill queue 145 comprises a three-input mux 411 and a register 421, denoted KR1, that receives the output of mux 411. Mux 411 includes a load data input that receives kill signal 141. Mux 411 also includes a hold data input that receives the output of register KR1 421. Mux 411 also includes a shift data input that receives the output of register KR2 422. Mux 411 receives lload[1] signal 142 of FIG. 1 as a control input. If lload[1]

142 is true, mux 411 selects kill signal 141 on the load data input; or else if lshift 168 is true, mux 411 selects the output of register KR2 422; otherwise, mux 411 selects the output of register KR1 4291 on the hold data input. Register KR1 421 loads the value of the output of mux 411 on the rising edge of clk 202 of FIG. 2.

The bottom registered-mux in kill queue 145 comprises a three-input mux 410 and a register 420, denoted KR0, that receives the output of mux 410. Mux 410 includes a load data input that receives kill signal 141. Mux 410 also includes a hold data input that receives the output of register KR0 420. Mux 410 also includes a shift data input that receives the output of register KR1 421. Mux 410 receives lload[0] signal 142 of FIG. 1 as a control input. If lload[0] 142 is true, mux 410 selects kill signal 141 on the load data input; or else if lshift 168 is true, mux 410 selects the output of register KR1 421; otherwise, mux 410 selects the output of register KR0 420 on the hold data input. Register KR0 420 loads the value of the output of mux 410 on the rising edge of clk 202 of FIG. 2. The output of mux 410 is provided on kill0 signal 143 of FIG. 1.

Figure 5:
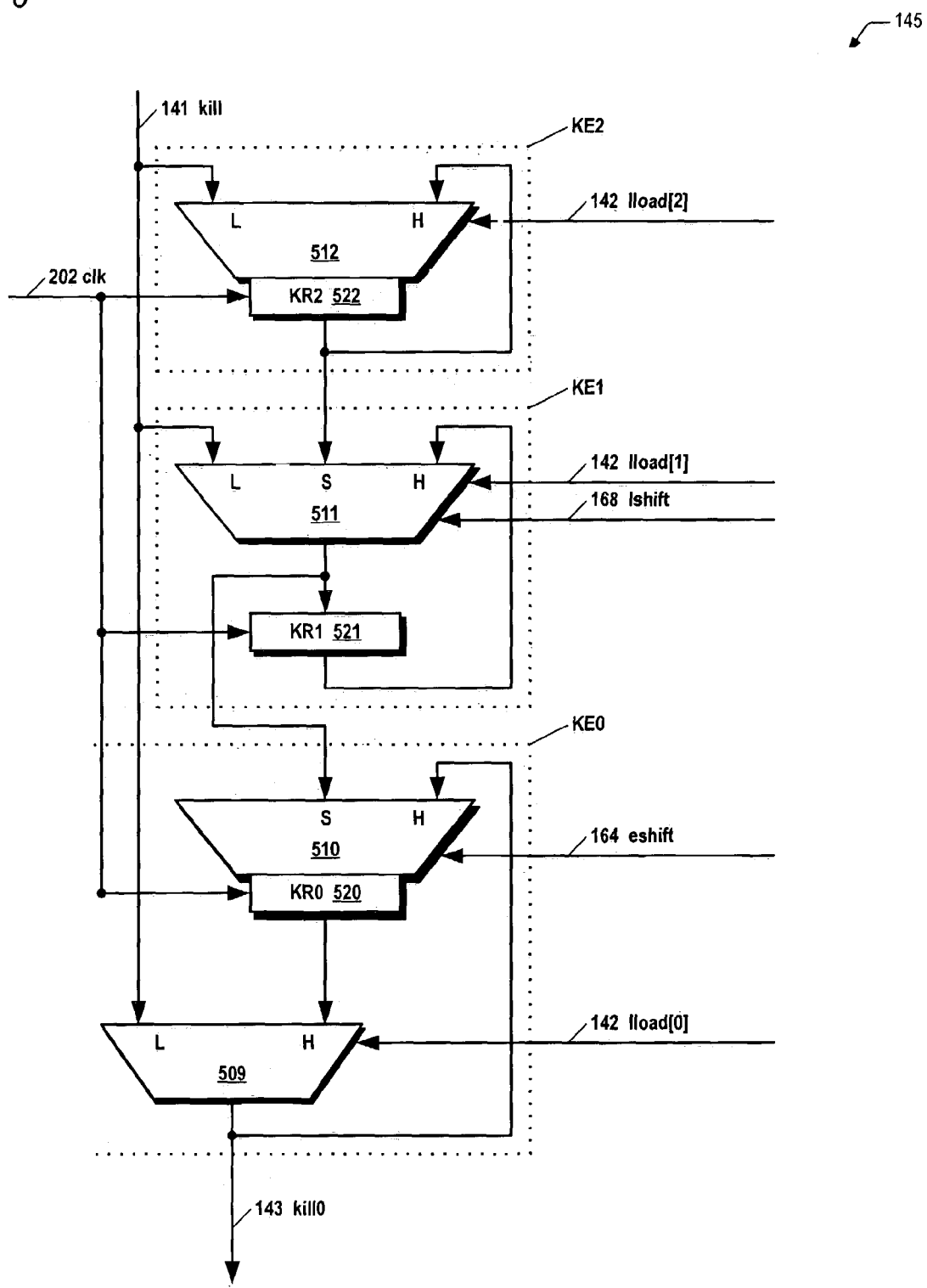
FIG. 5 is a block diagram illustrating a second embodiment of the kill queue of FIG. 1 according to the present invention.

Referring now to FIG. 5, a block diagram illustrating a second embodiment of kill queue 145 of FIG. 1 according to the present invention is shown. Kill queue 145 includes three muxed-registers, and a fourth mux connected in series to form a queue. The three muxed registers comprise entries KE2, KE1, and KE0 of FIG. 1.

The top muxed-register in kill queue 145 comprises a two-input, mux 512 and a register 522, denoted KR2, that receives the output of mux 512. Mux 512 includes a load data input that receives kill signal 141 of FIG. 1. Mux 512 also includes a hold data input that receives the output of register KR2 522. Mux 512 receives lload[2] signal 142 of FIG. 1 as a control input. If lload[2] 142 is true, mux 512 selects kill signal 141 on the load data input; otherwise, mux 512 selects the output of register KR2 522 on the hold data input. Register KR2 522 loads the value of the output of mux 512 on the rising edge of a clock signal denoted clk 202.

The middle muxed-register in kill queue 145 comprises a three-input mux 511 and a register 521, denoted KR1, that receives the output of mux 511. Mux 511 includes a load data input that receives kill signal 141. Mux 511 also includes a hold data input that receives the output of register KR1 521. Mux 511 also includes a shift data input that receives the output of register KR2 522. Mux 511 receives lload[1] signal 142 of FIG. 1 as a control input. Mux 511 also receives lshift signal 168 of FIG. 1 as a control input. If lload[1] 142 is true, mux 511 selects kill signal 141 on the load data input; or else if lshift signal 168 is true, mux 511 selects the output of register KR2 522 on the shift data input; otherwise, mux 511 selects the output of register KR1 521 on the hold data input. Register KR1 521 loads the value of the output of mux 511 on the rising edge of clk 202.

The bottom muxed-register, in kill queue 145 comprises a two-input mux 510, a register 520, denoted KR0, that receives the output of mux 510, and a two-input mux 509. Mux 509 includes a load data input that receives kill signal 141. Mux 509 also includes a hold data input that receives the output of register KR0 520. Mux 509 receives lload[0] signal 142 of FIG. 1 as a control input. If lload[0]142 is true, mux 509 selects kill signal 141 on the load data input; otherwise, mux 509 selects the output of register KR0 520 on the hold data input. Mux 510 includes a hold data input that receives the output of mux 509, which is also kill0 signal 143 of FIG. 1. Mux 510 also includes a shift data input that receives the output of mux 511. Mux 510 receives eshift signal 164 as a control input. If eshift signal 164 is true, mux 510 selects the output of mux 511 on the shift data input; otherwise, mux 510 selects the output of mux 509 on the, hold data input. Register KR0 520 loads the value of the output of mux 510 on the rising edge of clk 202.

Figure 6:
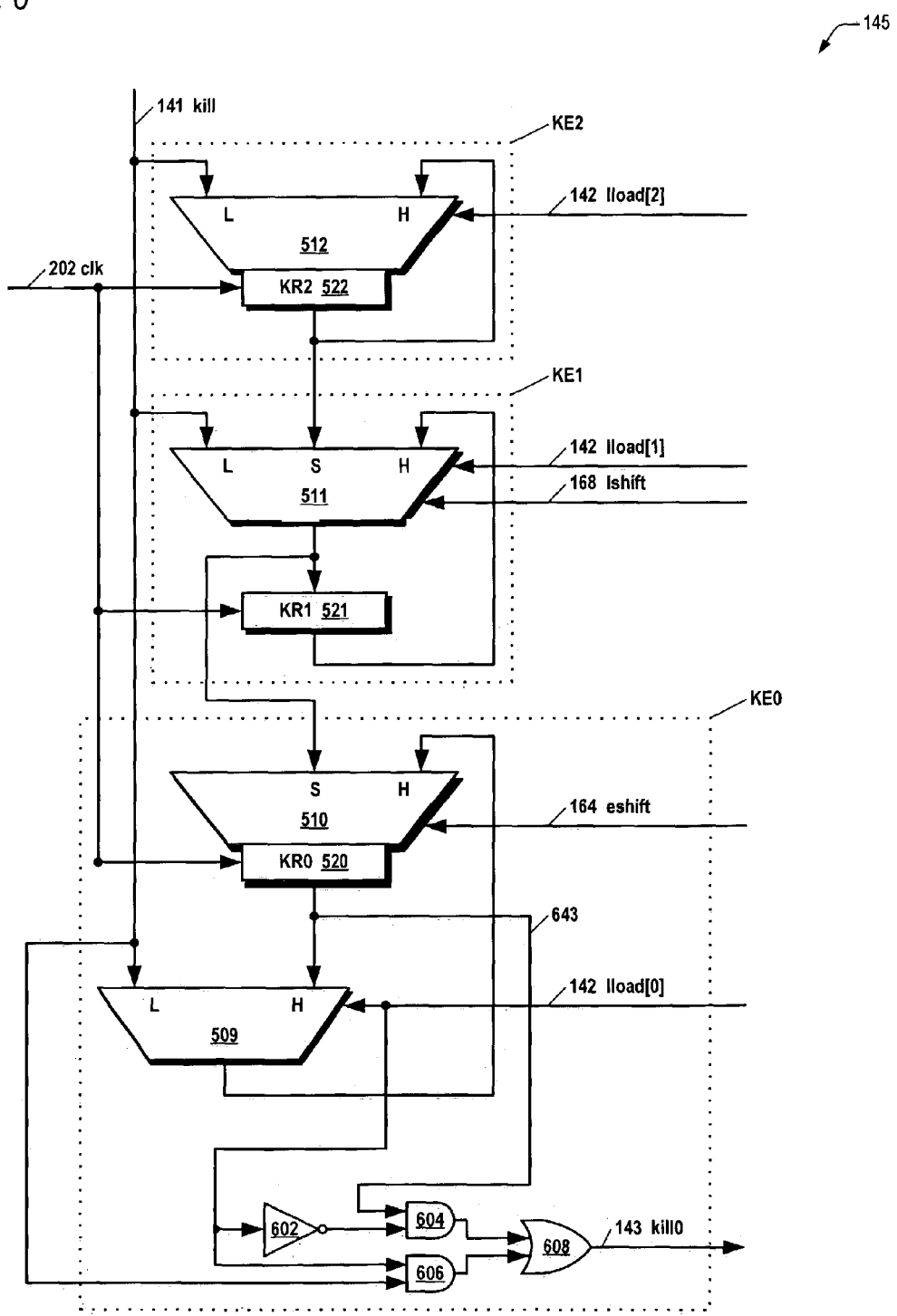
FIG. 6 is a block diagram illustrating a third embodiment of the kill queue of FIG. 1 according to the present invention.

Referring now to FIG. 6, a block diagram illustrating a third embodiment of kill queue 145 of FIG. 1 according to the present invention is shown. Kill queue 145 of FIG. 6 is similar to kill queue 145 of FIG. 5 and like elements are numbered alike. The differences between the kill queue 145 of FIG. 6 and FIG. 5 are as follows. Entry KE0 of kill queue 145 of FIG. 6 also includes four logic gates: an inverter 602, two two-input AND gates 604 and 606, and a two-input OR gate 608. Inverter 602 receives lload[0] signal 142 and provides its output to one input of AND gate 604. AND gate 604 receives as its second input the output of register KR0 520. AND gate 606 receives on one input lload[0] signal 142 and kill signal 141 on its other input. The outputs of AND gates 604 and 606 are provided as the inputs to OR gate 608. The output of OR gate 608 is provided as kill0 signal 143 for kill queue 145 of FIG. 1, rather than the output of mux 509 as in kill queue 145 of FIG. 5.

Figure 7:
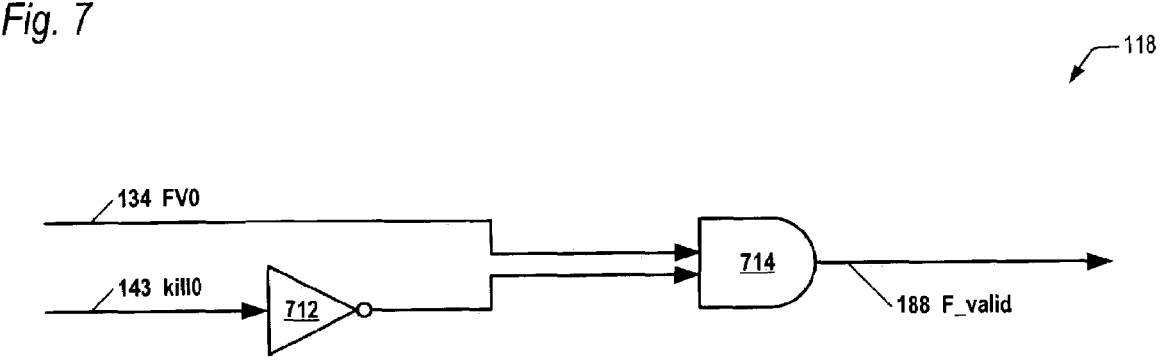
FIG. 7 is a block diagram of logic within the FIQ control logic for generating the F_valid signal of FIG. 1 according to the present invention.

Referring now to FIG. 7, a block diagram of logic within FIQ control logic 118 for generating F_valid signal 188 of FIG. 1 according to the present invention is shown. The logic includes an inverter 712 and a two-input AND gate 714. Inverter 712 receives kill0 signal 143 of FIG. 1 and provides its output to one of the inputs of AND gate 714. The other input of AND gate 714 is formatted instruction queue 187 valid bit FV0 134 of FIG. 1. Hence, valid bit FV0 134 is qualified by kill0 signal 143, such that XIQ control logic 156 may be notified that the instruction provided to instruction translator 138 on early0 signal 193 is invalid, i.e., is being killed.

Figure 8:
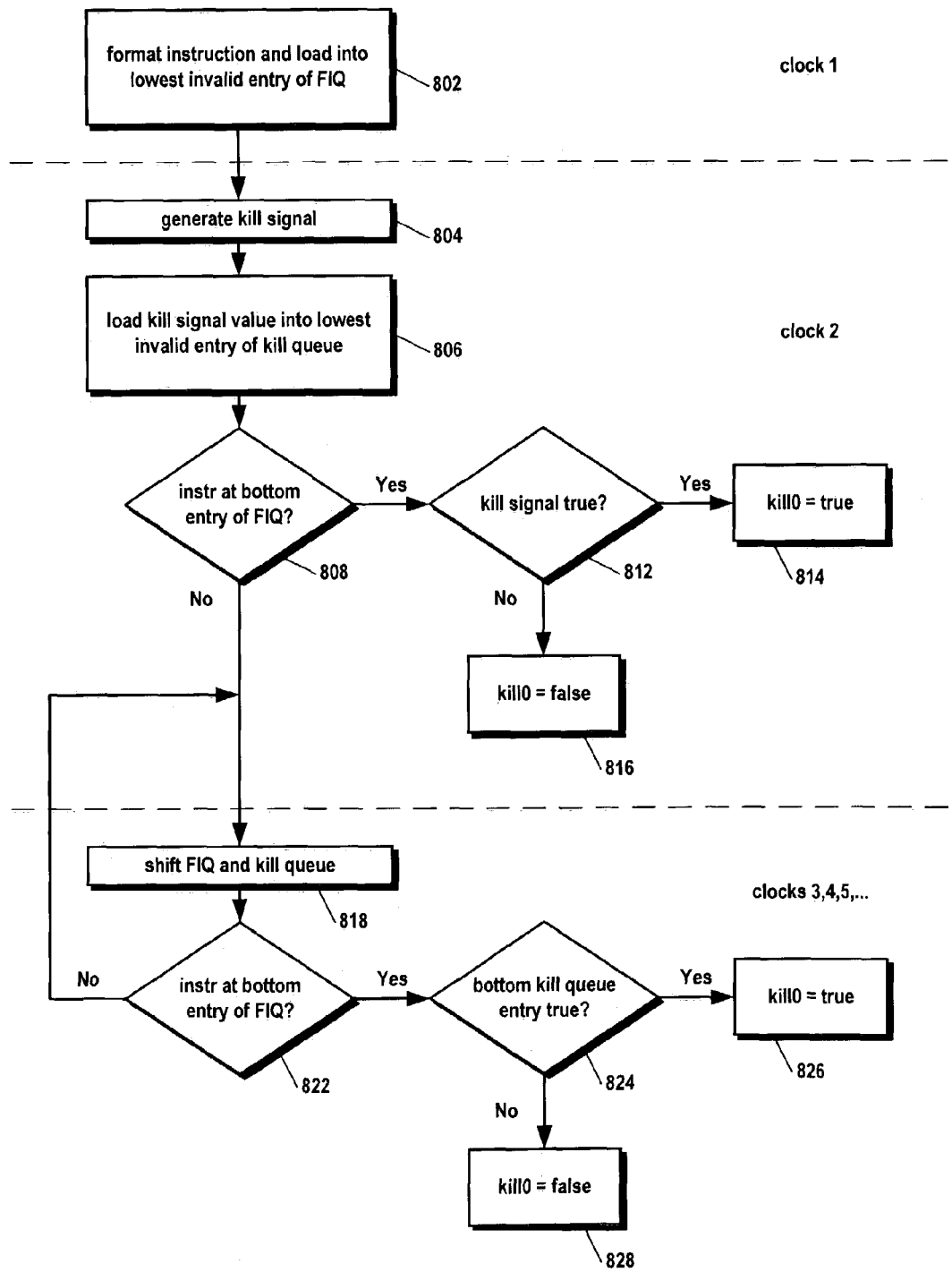
FIG. 8 is a flowchart illustrating operation of the instruction kill apparatus of the microprocessor of FIG. 1 according to the present invention.

Referring now to FIG. 8, a flowchart illustrating operation of the instruction kill apparatus of microprocessor 100 of FIG. 1 according to the present invention is shown. Flow begins at block 802.

At block 802, instruction formatter 116 of FIG. 1 formats an instruction in instruction byte buffer 112 and FIQ control logic 118 loads the formatted instruction into early queue 132. In particular, FIQ control logic 118 loads the formatted instruction into the lowest entry in early queue 132 that is invalid. In one embodiment, block 802 occurs during a first clock cycle, denoted clock 1 in FIG. 8. Flow proceeds to block 804.

At block 804, control logic 102 of FIG. 1 generates a true value on kill signal 141 of FIG. 1 to indicate that the instruction loaded into early queue 132 during the previous clock cycle must be killed. In one embodiment, block 804 occurs during the clock cycle after clock cycle 1, denoted clock 2 in FIG. 8. Flow proceeds to block 806.

At block 806, kill queue 145 loads the value of kill signal 141 generated at block 804 during clock 2. The value of kill signal 141 is loaded into the lowest invalid entry of kill queue 145. Flow proceeds to decision block 808.

At decision block 808, a determination is made whether the instruction loaded into formatted instruction queue 187 at block 802, i.e., the instruction to be killed, is at the bottom entry of formatted instruction queue 187. If so, flow proceeds to decision block 812. Otherwise, flow proceeds to block 818.

At decision block 812, a determination is made whether kill signal 141 is true. If so, flow proceeds to block 814. Otherwise, flow proceeds to block 816.

At block 814, a true value is generated on kill0 signal 143 of FIG. 1, thereby killing the instruction by qualifying FIQ valid bit FV0 134 to generate a false value on F_valid signal 188 of FIG. 1. Flow ends at block 814.

At block 816, a false value is generated on kill0 signal 143; hence, F_valid 188 is true if FV0 134 is true. Flow ends at block 816. In one embodiment, blocks 804 through 816 all occur during clock 2.

At block 818, formatted instruction queue 187 and kill queue 145 are shifted down one entry. Flow proceeds to decision block 822.

At decision block 822, a determination is made whether the instruction loaded into formatted instruction queue 187 at block 802, i.e., the instruction to be killed, is at the bottom entry of formatted instruction queue 187. If so, flow proceeds to decision block 824. Otherwise, flow returns to block 818.

At decision block 824, a determination is made whether the bottom entry of kill queue 145 is true. If so, flow proceeds to block 826. Otherwise, flow proceeds to block 828.

At block 826, a true value is generated on kill0 signal 143 of FIG. 1, thereby killing the instruction by qualifying FIQ valid bit FV0 134 to generate a false value on F_valid signal 188 of FIG. 1. Flow ends at block 826.

At block 828, a false value is generated on kill0 signal 143; hence, F_valid 188 is true if FV0 134 is true. Flow ends at block 828. In one embodiment, each iteration of blocks 818 through 828 occur during a third clock cycle subsequent to clock 2, denoted clock 3, or subsequent clock cycles until the instruction to be killed reaches the bottom entry of formatted instruction queue 187.

Figure 9:
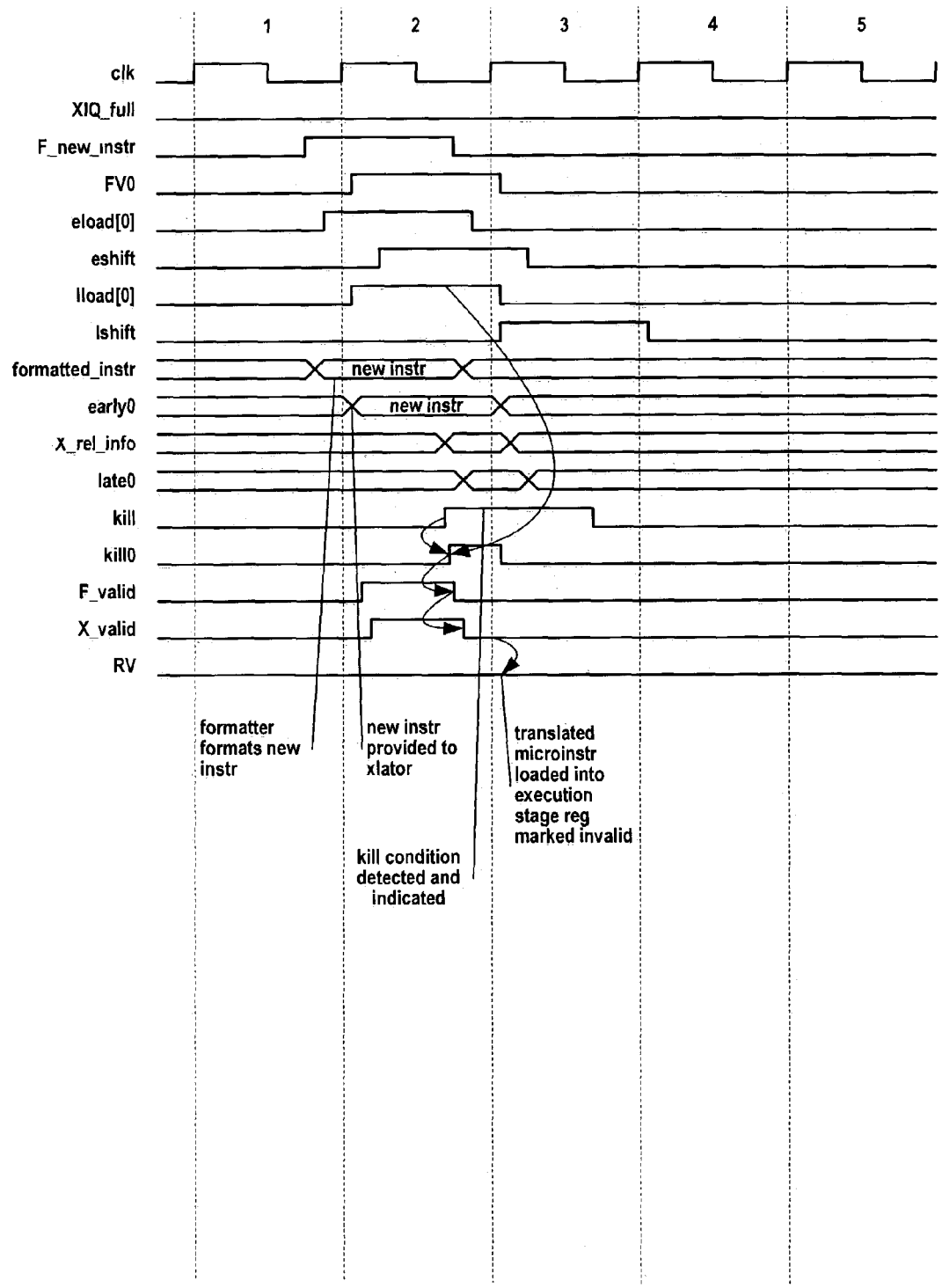
FIG. 9 is a timing diagram illustrating operation of the instruction kill apparatus of FIG. 1 according to the present invention.

Referring now to FIG. 9, a timing diagram illustrating operation of the instruction kill apparatus of FIG. 1 according to the present invention is shown. FIG. 9 shows five clock cycles each beginning with the rising edge of clk signal 202 of FIGS. 2 through 6. By convention, true signal values are shown as high logic levels in FIG. 9. FIG. 9 illustrates a scenario in which at the time instruction formatter 116 generates a new formatted macroinstruction, XIQ 154 of FIG. 1 is not full, i.e., XIQ 154 is able to receive a microinstruction from the instruction translator 138, and formatted instruction queue 187 is empty. Additionally in the example of FIG. 9, XIQ 154 is empty when instruction translator 138 translates the new formatted macroinstruction on early0 193 and generates the new microinstruction 171. Consequently, XIQ control logic 156 provides the value of F_valid signal 188 on X_valid signal 148 rather than storing F_valid 188 into valid bits XV 149, as shown in FIG. 9.

During clock cycle 1, instruction formatter 116 generates a true value on F_new_instr signal 152 of FIG. 1 to indicate a valid new formatted macroinstruction is present on formatted_instr 197 of FIG. 1, as shown. Because formatted instruction queue 187 is empty, FIQ control logic 118 of FIG. 1 generates a true value on eload[0] signal 162 to load the valid new formatted macroinstruction from formatted_instr 197 into EE0, which is the lowest empty entry in formatted instruction queue 187. Also in the example, kill signal 141, kill0 signal 143, F_valid 188, X_valid 148, and valid bit RV 189 of FIG. 1 are all false, as shown.

During clock cycle 2, FV0 134 of FIG. 1, the valid bit for formatted instruction queue 187 entry EE0, is set to indicate that EE0 contains a valid instruction. On the rising edge of clock cycle 2, one of registers 183 of FIG. 1 loads eload[0] 162 and outputs a true value on lload[0] 142. Because eload[0] 162 is true, the new instruction is loaded into ER0 220 and output on early0 signal 193 of FIG. 1, as shown, for provision to instruction translator 138 of FIG. 1. Instruction translator 138 translates the new macroinstruction and provides the translated microinstruction 171 to XIQ 154. In addition, control logic 102 generates new information related to the new instruction on X_rel_info 186, as shown. Because lload[0] 142 is true, mux 410 selects the load data input, and outputs on late0 191 the new related information provided on X_rel_info 186, as shown, for provision to XIQ 154 and mux 172 of FIG. 1. Furthermore, FIQ control logic 118 generates a true value on eshift signal 164 of FIG. 1 so that the instruction will be shifted out of formatted instruction queue 187 during clock cycle 3, since the instruction translator 138 translates the new instruction during clock cycle 2.

Also during clock cycle 2, control logic 102 detects a condition in which the new instruction generated during clock cycle 1 must be killed, and consequently generates a true value on kill signal 141 of FIG. 1 part way through clock 2. Because during the latter part of clock 2 lload[0]142 and kill signal 141 are both true, kill0 signal 143 is also true, according to FIGS. 4 through 6. Furthermore, because kill0 signal 143 is true, F_valid 188 is false, according to FIG. 7. Finally, because F_valid 188 is false and XIQ 154 is empty, X_valid 148 is false at the end of clock, 2 as shown. RV 189 remains false.

During clock cycle 3, FV0 134 is false since the new instruction is shifted out of formatted instruction queue 187. On the rising edge of clock cycle 3, XIQ control logic 156 loads the translated microinstruction 171 and related instruction information provided on late0 191 into execution stage register 176, since XIQ 154 is empty. Additionally, register 185 of FIG. 1 loads eshift signal 164 and outputs a true value on lshift 168. Furthermore, the false value of X_valid 148 at the end of clock cycle 2 is loaded into RV 189, which is shown false during clock cycle 3. Hence, the microinstruction 171 generated by instruction translator 138 during clock 2 and loaded into execution stage register 176 is marked invalid and consequently will not be executed by the execution stages of the microprocessor 100 pipeline, as desired.

As may be observed from FIG. 9, although the new macroinstruction is generated and loaded into formatted instruction queue 187 during clock cycle 1 but the kill signal 141 is not generated until clock cycle 2, the instruction kill apparatus of FIG. 1 advantageously enables the macroinstruction to be killed, i.e., marked invalid, so that the execution stages do not execute the killed instruction.

Figure 10:
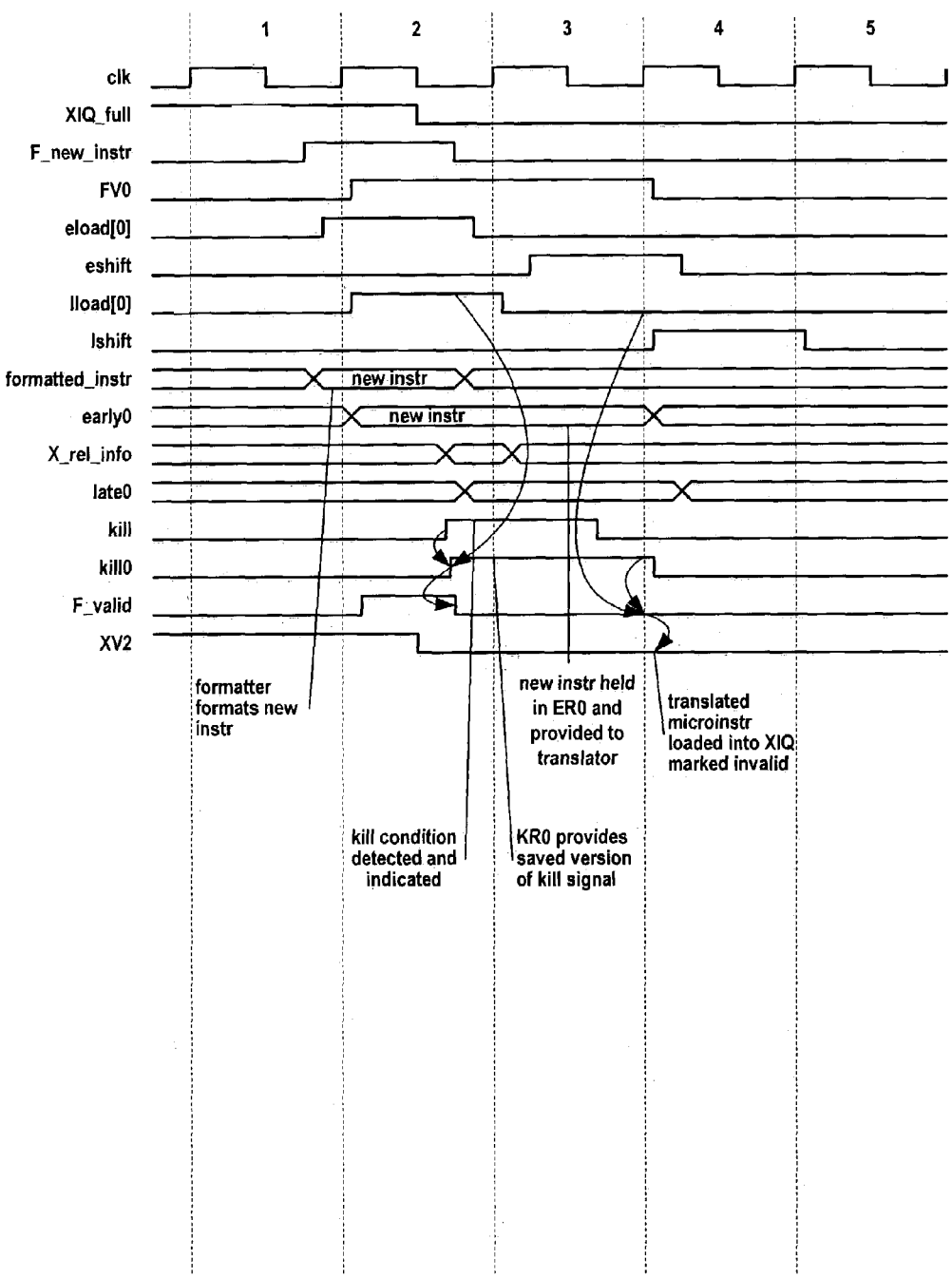
FIG. 10 is a timing diagram illustrating operation of the instruction kill apparatus of FIG. 1 according to the present invention.

Referring now to FIG. 10, a timing diagram illustrating operation of the instruction kill apparatus of FIG. 1 according to the present invention is shown. FIG. 10 is similar to FIG. 9, except XIQ 154 is full when instruction formatter 116 generates a new formatted macroinstruction in the scenario of FIG. 10. Because, XIQ 154 is full in the example of FIG. 10, the value of XIQ 154 valid bit XV2 149 is shown rather than the value of RV 189, and the value of X_valid 148 is not shown.

During clock cycle 1, XIQ_full 195 is true. Instruction formatter 116 generates a new instruction on formatted instr 197 and F_new_instr 152 is true, as in FIG. 9. Because formatted instruction queue 187 is empty, FIQ control logic 118 generates a true value on eload[0] signal 162 to load the valid new formatted macroinstruction from formatted instr 197 into EE0, as in FIG. 9. Kill signal 141, kill0 signal 143, and F_valid 188 of FIG. 1 are all false, as in FIG. 9. However, valid bit XV2 149 is true since XIQ 154 is full, i.e., entry 2 of XIQ 154 is valid.

During clock cycle 2, FV0 134 is set; register 183 outputs a true, value on lload[0] 142; the new instruction is loaded into ER0 220 and output on, early0 signal 193 for provision to instruction translator 138; new information related to the new instruction is generated on X_rel_info 186; and mux 310 selects the load data input, and outputs on late0 191 the new related information provided on X_rel_info 186 for provision to XIQ 154 and mux 172; as in FIG. 9. However, since XIQ 154 is full at the start of clock cycle 2, FIQ control logic 118 generates a false value on eshift signal 164, unlike in FIG. 9. XIQ control logic 156 subsequently deasserts XIQ_full 195 to indicate that instruction translator 138 will be ready to translate a new macroinstruction during clock cycle 3.

Also during clock cycle 2, control logic 102 detects a condition in which the new instruction generated during clock cycle 1 must be killed, and consequently generates a true value on kill signal 141 part way through clock 2. Because in the latter part of clock 2 lload[0] 142 and kill signal 141 are both true, kill0 signal 143 is also true, according to FIGS. 4 through 6. Furthermore, because kill0 signal 143 is true, F_valid 188 is false, according to FIG. 7. Because XIQ 154 is shifted down making XIQ 154 no longer full during clock 2, XV2 149 transitions to false to indicate the instruction in the top entry of XIQ 154, i.e., the entry whose validity is specified by XV2 149, is no longer valid.

During clock cycle 3, as a consequence of eshift signal 164 being false at the rising edge of clk 202, the new instruction is held in ER0 220 and provided to instruction translator 138 on early0 193 for translation. Commensurately, FV0 134 remains true. Instruction translator 138 translates the new macroinstruction and provides the translated microinstruction 171 to XIQ 154. Because lload[0] 142 is true at the rising edge of clk 202, the related information provided on X_rel_info 186 during clock cycle 2 is loaded into LR0 320. Because lload[0] 142 and lshift 168 are false during the remainder of clock cycle 3, the contents of LR0 320, i.e., the new information related to the instruction, is provided to XIQ 154 on late0 191, as shown. After the start of clock cycle 3, FIQ control logic 118 generates a true value on eshift signal 164 so that the new instruction will be shifted out of formatted instruction queue 187 during clock cycle 4.

Also during clock cycle, 3, kill0 signal 143 continues to be true according to FIGS. 4 through 6. That is, the true value of kill signal 141 generated during clock 2 and loaded into kill queue 145 entry KE0 is held during clock 3 and provided on kill0 signal 143. Because kill0 signal 143 is true, F_valid 188 remains false throughout clock 3 to indicate that the instruction 193 being provided to instruction translator 138 is not a valid instruction. This is necessary since during clock cycle 2 control logic 102 generated a true value on kill signal 141 to indicate that the instruction 197 generated during clock cycle 1 must be killed XV2 149 remains false. Furthermore, control logic 102 deasserts kill signal 141 during clock cycle 3.

During clock cycle 4, FV0 134 transitions to false since the new instruction is shifted out of formatted instruction queue 187. On the rising edge of clock cycle 4, register 185 of FIG. 1 loads eshift signal 164 and outputs a true value on lshift 168. Additionally, XIQ control logic 156 loads the translated microinstruction 171 and related instruction information provided on late0 191 into XIQ 154. However, because F_valid 188 is false at the end of clock cycle 3, a false value is loaded into XV2 149 to indicate that the translated microinstruction 171 loaded into XIQ 154 is invalid. Hence, the microinstruction 171 generated by instruction translator 138 during clock 3 and loaded into XIQ 154 is marked invalid and consequently will not be executed by the execution stages of the microprocessor 100 pipeline when issued from XIQ 154, as desired. In one embodiment, because the entry in XIQ 154 receiving the microinstruction 171 is marked invalid, it may be overwritten by a subsequent microinstruction.

As may be observed from FIG. 10, although the new macroinstruction is generated and loaded into formatted instruction queue 187 during clock cycle 1 but the kill signal 141 is not generated until clock cycle 2, the instruction kill apparatus of FIG. 1 advantageously enables the macroinstruction to be killed, i.e., marked invalid, so that the execution stages do not execute the killed instruction.

Figure 11:
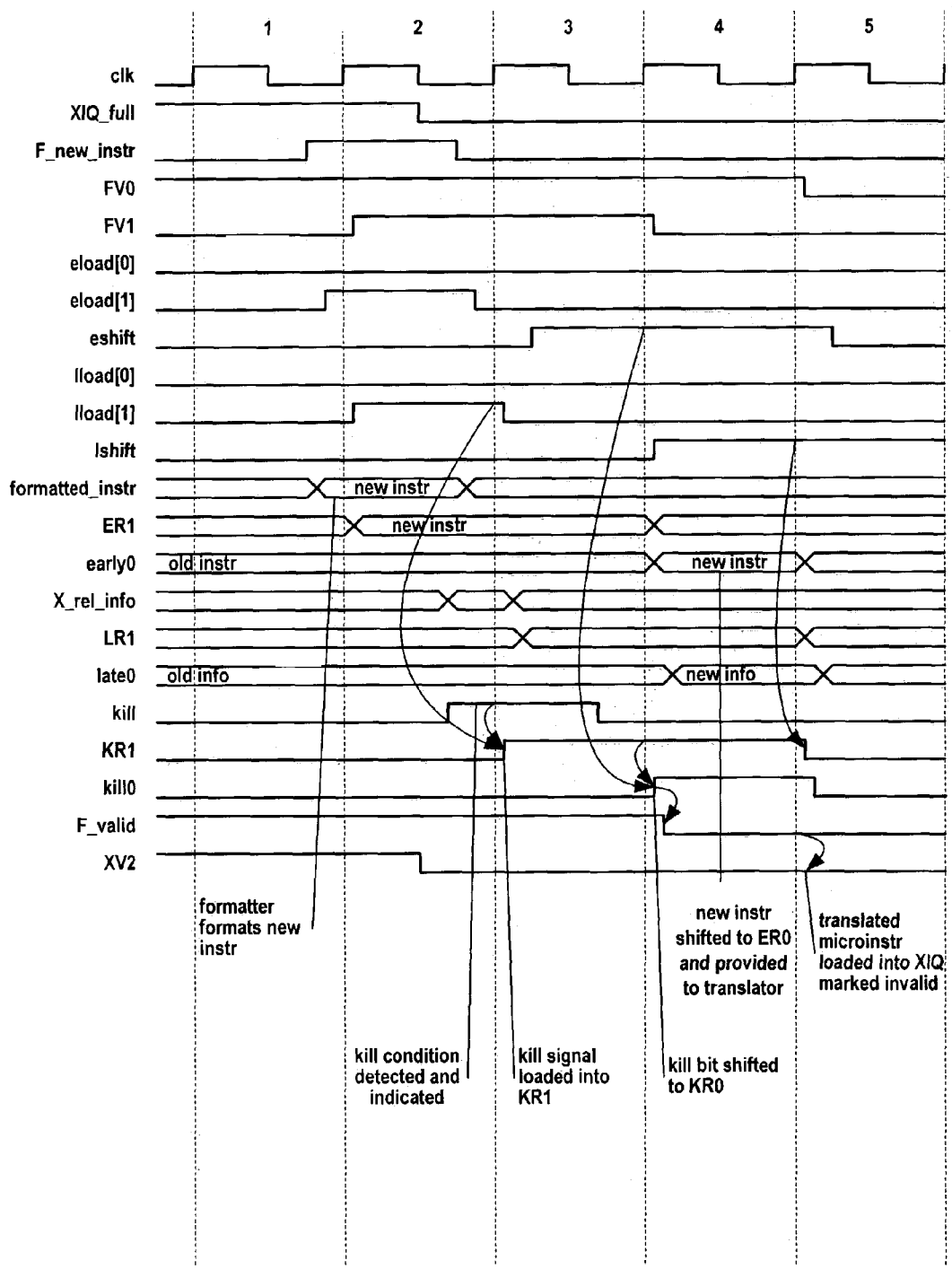
FIG. 11 is a timing diagram illustrating operation of the instruction kill apparatus of FIG. 1 according to the present invention.

Referring now to FIG. 11, a timing diagram illustrating operation of the instruction kill apparatus of FIG. 1 according to the present invention is shown. FIG. 11 is similar to FIG. 10, except in the scenario of FIG. 11 when instruction formatter 116 generates a new formatted macroinstruction, formatted instruction queue 187 is not empty, in addition to the XIQ 154 being full. Consequently, the value of kill signal 141 of FIG. 1 must be loaded into an entry of kill queue 145 corresponding to the entry in formatted instruction queue 187 into which the new macroinstruction is loaded, and subsequently shifted down in coordination with formatted instruction queue 187 to provide the correct saved value of kill signal 141 when the new macroinstruction is provided by formatted instruction queue 187 to instruction translator 138, as described below. Therefore, the value of kill queue 145 register KR1 (denoted 421 in FIG. 4 and 521 in FIGS. 5 and 6, and referred to henceforth as KR1 421) is also shown in FIG. 11.

During clock cycle 1, XIQ_full 195 is true. Instruction formatter 116 generates a new instruction on formatted_instr 197 and F_new_instr 152 is true, as in FIGS. 9 and 10. FV0 134 is true since EE0 contains a valid instruction; however, FV1 134, the valid bit for formatted instruction queue 187 entry EE1 of FIG. 1, is false, as shown, since EE1 does not contain a valid instruction. Consequently, FIQ control logic 118 generates a true value on eload[1] signal 162 to load the valid new formatted macroinstruction from formatted_instr 197 into EE1. Signal early0 193 provides the instruction held in EE0, referred to in FIG. 11 as old instr, and signal late0 191 provides the information related to the old instruction held in LE0, referred to as old info, as shown. Kill signal 141 and kill0 signal 143 of FIG. 1 are both false, and valid bit XV2 149 is true, as in FIG. 10. However, F_valid 188 is true since FV0 134 is true and kill signal 141 is false. KR1 421 is false.

During clock cycle 2, FV1 134 is set to indicate that EE1 now contains a valid instruction. FV0 134 also remains set. The old instr is held in ER0 220 and the old info is held in LR0 320. Register 183 outputs a true value on lload[1] 142. The new instruction is loaded into ER1 221, as shown. The new information related to the new instruction is generated on X_rel_info 186, and mux 311 of FIG. 3 selects the load data input, which is provided to register LR1 321. Since XIQ 154 is full at the start of clock cycle 2, FIQ control logic 118 generates a false value on eshift signal 164. XIQ control logic 156 subsequently deasserts XIQ_full 195 to indicate that instruction translator 138 will be ready to translate a new macroinstruction during clock cycle 3.

Also during, clock cycle 2, control logic 102 detects a condition in which the new instruction generated during clock cycle 1 must be killed, and consequently generates a true value on kill signal 141 part way through clock 2. KR1 421 remains false. Kill0 signal 143 is false, according to FIGS. 4 through 6 since in the example the instruction in EE0 of formatted instruction queue 187 does not need to be killed. Furthermore, because kill0 signal 143 remains false and FV0 134 remains true, F_valid 188 remains true, according to FIG. 7. Because XIQ 154 is shifted down making XIQ 154 no longer full during clock 2, XV2 149 transitions to false to indicate the instruction in the top entry of XIQ 154, i.e., the entry whose validity is specified by XV2 149, is no longer valid.

During clock cycle 3, as a consequence of eshift signal 164 being false at the rising edge of clk 202, the new instruction is held in ER1 221. Additionally, the old instr is held in ER0 220 and provided to instruction translator 138 on early0 193 for translation. FV1 and FV0 134 remain true. Instruction translator 138 translates the old instr and provides its translated microinstruction 171 to XIQ 154. Because lload[0] 142 and lshift 168 are false during the remainder of clock cycle 3, the contents of LR0 320, i.e., the old info related to the old instr, is provided to XIQ 154 on late0 191, as shown. Because lload[1] 142 is true at the rising edge of clk 202, the new related information provided on X_rel_info 186 during clock cycle 2 is loaded into LR1 321. After the start of clock cycle 3, FIQ control logic 118 generates a true value on eshift signal 164 so that the new instruction will be shifted from EE1 to EE0 during clock cycle 4.

Also during clock cycle 3, because lload[1] 142 and kill signal 141 were true at the end of clock cycle 2, a true value gets loaded into KR1 421, as shown. However, kill0 signal 143 remains false, according to FIGS. 4 through 6. Consequently F_valid 188 also remains true, since FV0 134 remains true. Furthermore, control logic 102 deasserts kill signal 141 during clock cycle 3.

During clock cycle 4, FV1 134 is false since the new instruction is shifted from EE1 to EE0. On the rising edge of clock cycle 4, XIQ control logic 156 loads the microinstruction 171 translated from old instr and related instruction information provided on late0 191 into XIQ 154. Additionally, register 185 loads eshift signal 164 and outputs a true value on, lshift 168. Eshift 164 remains true since XIQ 154 is ready to receive another microinstruction. As a consequence of eshift signal 164 being true at the rising edge of clk 202, the new instruction is shifted from ER1 221 to ER0 220 and provided to instruction translator 138 on early0 193 for translation. FV0 134 remains true. Instruction translator 138 translates the new instruction and provides the microinstruction, 171 translated from the new instruction to XIQ 154. Because lshift 168 is true during clock cycle 4, the information related to the new instruction held in LR1 321 is selected on the shift data input of mux 310 and provided on late0 signal 191, as shown.

Also during clock cycle 4, the value of kill signal 141 generated during clock cycle 2 and saved in kill queue 145, i.e., the kill bit, is shifted down from KR1 421 to KR0 420 of FIG. 4 (or KR0 520 of FIGS. 5 and 6), thereby causing a true value to be generated on kill0 signal 143, according to FIGS. 4 through 6. Consequently, F_valid 188 transitions to false, according to FIG. 7.

During clock cycle 5, FIQ control logic 118 clears FV0 134 since the new instruction is shifted out of formatted instruction queue 187. On the rising edge of clock cycle 5, XIQ control logic 156 loads the microinstruction 171 translated from the new instruction and related instruction information provided on late0 191 into XIQ 154. However, because F_valid 188 is false at the end of clock cycle 4, a false value is loaded into XV2 149 to indicate that the translated microinstruction 171 loaded into XIQ 154 is invalid. Hence, the microinstruction 171 generated by instruction translator 138 during clock 3 and loaded into XIQ 154 is marked invalid and consequently will not be executed by the execution stages of the microprocessor 100 pipeline when issued from XIQ 154, as desired. In one embodiment, because the entry in XIQ 154 receiving the microinstruction 171 is marked invalid, it may be overwritten by a subsequent microinstruction.

As may be observed from FIG. 11, although the new macroinstruction is generated and loaded into formatted instruction queue 187 during clock cycle 1 but the kill signal 141 is not generated until clock cycle 2, the instruction kill apparatus of FIG. 1 advantageously enables the macroinstruction to be killed, i.e., marked invalid, so that the execution stages do not execute the killed instruction.

Although the present invention and its objects, features, and advantages have been described in detail, other embodiments are encompassed by the invention. For example, although various conditions are described in which an instruction must be killed, the present invention may be used to kill instructions under other conditions. Additionally, although an embodiment has been described in which the microprocessor translates macroinstructions into microinstructions, an embodiment is contemplated in which the microprocessor is a reduced instruction set computer (RISC) processor that decodes RISC instructions rather than translating macroinstructions to microinstructions.

In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. An apparatus for killing an instruction loaded into an instruction queue of a microprocessor during a first clock cycle and output from a bottom entry of the instruction queue during a second clock cycle subsequent to the first clock cycle, the apparatus comprising:

a kill signal, for conveying a value generated during a third clock cycle subsequent to the first clock cycle;

a kill queue, coupled to said kill signal, for loading said kill signal value generated during said third clock cycle, and for outputting said kill signal value during the second clock cycle;

a load signal, coupled to said kill queue, for indicating during the second clock cycle whether the instruction was loaded into the bottom entry of the instruction queue during the first clock cycle, wherein if said load signal is true, said third clock cycle and the second clock cycle are a same clock cycle; and a valid signal, coupled to said kill queue, generated during the second clock cycle for indicating whether the instruction is to be executed by the microprocessor, wherein said valid signal is false if said kill signal value output by said kill queue during the second clock cycle is true.

2. The apparatus of claim 1, wherein said third clock cycle is a same clock cycle as the second clock cycle.

3. The apparatus of claim 1, wherein said third clock cycle is a clock cycle prior to the second clock cycle.

4. The apparatus of claim 1, wherein if said load signal is false, the second clock cycle is subsequent to said third clock cycle.

5. The apparatus of claim 1, further comprising:

logic, coupled to said kill queue, for generating said valid signal during the second clock cycle based on said load signal and said kill signal value output by said kill queue.

6. The apparatus of claim 1, wherein said kill queue comprises:

a plurality of entries, for storing a plurality of values of said kill signal generated during a corresponding plurality of clock cycles.

7. The apparatus of claim 6, wherein each of said plurality of kill queue entries comprises a load data input, coupled to receive said kill signal.

8. The apparatus of claim 6, wherein each of said plurality of kill queue entries comprises a hold data input, coupled to receive a current value of said entry.

9. The apparatus of claim 6, wherein each of said plurality of kill queue entries comprises a shift data input, coupled to receive one of said plurality of values of said kill signal from one of said plurality of entries above said each of said plurality of kill queue entries.

10. The apparatus of claim 6, wherein the instruction queue comprises a plurality of entries for storing a plurality of instructions, wherein said plurality of kill queue entries store corresponding said kill signal values for said plurality of instructions stored in said plurality of instruction queue entries.

11. The apparatus of claim 1, wherein the instruction comprises a variable length instruction.

12. The apparatus of claim 11, wherein said variable length instruction comprises an x86 architecture instruction.

13. The apparatus of claim 11, wherein the instruction is provided to the instruction queue during the first clock cycle by an instruction formatter, said instruction formatter determining a length of the instruction.

14. The apparatus of claim 1, wherein the instruction is output from the bottom entry of the instruction queue during the second clock cycle to an instruction translator for translating the instruction into one or more microinstructions to be selectively executed by the microprocessor based on said valid signal.

15. A method for killing an instruction in a microprocessor, the method comprising:

loading an instruction into a first queue during a first clock cycle;

generating a kill signal during a second clock cycle subsequent to said first clock cycle;

loading a value of said kill signal into a second queue during said second clock cycle;

determining whether said value in the second queue is true during a third clock cycle in which said instruction is output from a bottom entry of said first queue;

generating a load signal for indicating during said third clock cycle whether said instruction was loaded into a bottom entry of said first queue during said first clock cycle, wherein if said load signal is true, said third clock cycle and said second clock cycle are a same clock cycle; and foregoing execution of said instruction if said value is true.

16. The method of claim 15, wherein said third clock cycle is a same clock cycle as said second clock cycle.

17. The method of claim 15, wherein said third clock cycle is clock cycle subsequent to said second clock cycle.

18. The method of claim 15, further comprising:

formatting said instruction prior to said loading said instruction into said first queue.

19. The method of claim 15, further comprising:

determining whether said instruction is shifted down in said first queue after said loading said instruction into said first queue; and shifting down said value of said kill signal in said second queue after said loading a value of said kill signal into a second queue, if said instruction is shifted down in said first queue.

20. The method of claim 15, further comprising:

predicting said instruction is a taken branch instruction, prior to said loading said instruction into said first queue;

detecting a misprediction of said branch instruction; and said generating said kill signal during said second clock cycle in response to said detecting said misprediction.

21. The method of claim 20, wherein a branch target address cache of the microprocessor performs said predicting said instruction is a taken branch instruction.

22. The method of claim 20, wherein said misprediction of said branch instruction comprises a misprediction of a length of said branch instruction.

23. The method of claim 20, wherein said misprediction of said branch instruction comprises a misprediction of an address of said branch instruction.

24. The method of claim 20, wherein said misprediction of said branch instruction comprises said branch instruction being a non-branch instruction.

25. The method of claim 15, further comprising:

branching the microprocessor based on a prediction that a branch instruction is taken, wherein said instruction is sequential to said branch instruction; and said generating said kill signal during said second clock cycle after said branching the microprocessor.

26. The method of claim 15, wherein said instruction sequentially follows a branch instruction predicted taken, the method further comprising:

said generating said kill signal during said second clock cycle in response to detecting said branch instruction is predicted taken.

27. A program embodied on a computer readable medium, comprising:
    computer-readable program code for providing an apparatus for killing an instruction loaded into an instruction queue of a microprocessor during a first clock cycle and output from a bottom entry of the instruction queue during a second clock cycle subsequent to the first clock cycle, said program code comprising:
        first program code for providing a kill signal, for conveying a value generated during a third clock cycle subsequent to the first clock cycle;
        second program code for providing a kill queue, coupled to said kill signal, for loading said kill signal value generated during said third clock cycle, and for outputting said kill signal value during the second clock cycle;
        third program code for providing a load signal, coupled to said kill queue, for indicating during the second clock cycle whether the instruction was loaded into the bottom entry of the instruction queue during the first clock cycle, wherein if said load signal is true, said third clock cycle and the second clock cycle are a same clock cycle; and
        fourth program code for providing a valid signal, coupled to said kill queue, generated during the second clock cycle for indicating whether the instruction is to be executed by the microprocessor, wherein said valid signal is false if said kill signal value output by said kill queue during the second clock cycle is true.

28. An apparatus for killing an instruction loaded into an instruction queue of a microprocessor during a first clock cycle and output from a bottom entry of the instruction queue during a second clock cycle subsequent to the first clock cycle, the apparatus comprising:
    a kill signal, for conveying a value generated during a third clock cycle subsequent to the first clock cycle;
    a kill queue, coupled to said kill signal, for loading said kill signal value generated during said third clock cycle, and for outputting said kill signal value during the second clock cycle;
    a load signal, coupled to said kill queue, for indicating during the second clock cycle whether the instruction was loaded into the bottom entry of the instruction queue during the first clock cycle, wherein if said load signal is false, the second clock cycle is subsequent to said third clock cycle; and
    a valid signal, coupled to said kill queue, generated during the second clock cycle for indicating whether the instruction is to be executed by the microprocessor, wherein said valid signal is false if said kill signal value output by said kill queue during the second clock cycle is true.

29. The apparatus of claim 28, wherein said third clock cycle is a same clock cycle as the second clock cycle.

30. The apparatus of claim 28, wherein said third clock cycle is a clock cycle prior to the second clock cycle.

31. The apparatus of claim 28, wherein if said load signal is true, said third clock cycle and the second clock cycle are a same clock cycle.

32. The apparatus of claim 28, further comprising:
    logic, coupled to said kill queue, for generating said valid signal during the second clock cycle based on said load signal and said kill signal value output by said kill queue.

33. The apparatus of claim 28, wherein said kill queue comprises:
    a plurality of entries, for storing a plurality of values of said kill signal generated during a corresponding plurality of clock cycles.

34. The apparatus of claim 33, wherein each of said plurality of kill queue entries comprises a load data input, coupled to receive said kill signal.

35. The apparatus of claim 33, wherein each of said plurality of kill queue entries comprises a hold data input, coupled to receive a current value of said entry.

36. The apparatus of claim 33, wherein each of said plurality of kill queue entries comprises a shift data input, coupled to receive one of said plurality of values of said kill signal from one of said plurality of entries above said each of said plurality of kill queue entries.

37. The apparatus of claim 33, wherein the instruction queue comprises a plurality of entries for storing a plurality of instructions, wherein said plurality of kill queue entries store corresponding said kill signal values for said plurality of instructions stored in said plurality of instruction queue entries.

38. The apparatus of claim 28, wherein the instruction comprises a variable length instruction.

39. The apparatus of claim 38, wherein said variable length instruction comprises an x86 architecture instruction.

40. The apparatus of claim 38, wherein the instruction is provided to the instruction queue during the first clock cycle by an instruction formatter, said instruction formatter determining a length of the instruction.

41. The apparatus of claim 28, wherein the instruction is output from the bottom entry of the instruction queue during the second clock cycle to an instruction translator for translating the instruction into one or more microinstructions to be selectively executed by the microprocessor based on said valid signal.

42. A method for killing an instruction in a microprocessor, the method comprising:
    loading an instruction into a first queue during a first clock cycle;
    generating a kill signal during a second clock cycle subsequent to said first clock cycle;
    loading a value of said kill signal into a second queue during said second clock cycle;
    determining whether said value in the second queue is true during a third clock cycle in which said instruction is output from a bottom entry of said first queue;
    generating a load signal for indicating during said third clock cycle whether said instruction was loaded into a bottom entry of said first queue during said first clock cycle, wherein if said load signal is false, said third clock cycle is subsequent to said second clock cycle; and
    foregoing execution of said instruction if said value is true.

43. The method of claim 42, wherein said third clock cycle is a same clock cycle as said second clock cycle.

44. The method of claim 42, wherein said third clock cycle is clock cycle subsequent to said second clock cycle.

45. The method of claim 42, further comprising:
    formatting said instruction prior to said loading said instruction into said first queue.

46. The method of claim 42, further comprising:
    determining whether said instruction is shifted down in said first queue after said loading said instruction into said first queue; and shifting down said value of said kill signal in said second queue after said loading a value of said kill signal into a second queue, if said instruction is shifted down in said first queue.

47. The method of claim 42, further comprising:
predicting said instruction is a taken branch instruction, prior to said loading said instruction into said first queue;
detecting a misprediction of said branch instruction; and
said generating said kill signal during said second clock cycle in response to said detecting said misprediction.

48. The method of claim 47, wherein a branch target address cache of the microprocessor performs said predicting said instruction is a taken branch instruction.

49. The method of claim 47, wherein said misprediction of said branch instruction comprises a misprediction of a length of said branch instruction.

50. The method of claim 47, wherein said misprediction of said branch instruction comprises a misprediction of an address of said branch instruction.

51. The method of claim 47, wherein said misprediction of said branch instruction comprises said branch instruction being a non-branch instruction.

52. The method of claim 42, farther comprising:
branching the microprocessor based on a prediction that a branch instruction is taken, wherein said instruction is sequential to said branch instruction; and
said generating said kill signal during said second clock cycle after said branching the microprocessor.

53. The method of claim 42, wherein said instruction sequentially follows a branch instruction predicted taken, the method further comprising:
said generating said kill signal during said second clock cycle in response to detecting said branch instruction is predicted taken.

54. A program embodied on a computer readable medium, comprising:
computer-readable program code for providing an apparatus for killing an instruction loaded into an instruction queue of a microprocessor during a first clock cycle and output from a bottom entry of the instruction queue during a second clock cycle subsequent to the first clock cycle, said program code comprising:
first program code for providing a kill signal, for conveying a value generated during a third clock cycle subsequent to the first clock cycle;
second program code for providing a kill queue, coupled to said kill signal, for loading said kill signal value generated during said third clock cycle, and for outputting said kill signal value during the second clock cycle;
third program code for providing a load signal, coupled to said kill queue, for indicating during the second clock cycle whether the instruction was loaded into the bottom entry of the instruction queue during the first clock cycle, wherein if said load signal is false, the second clock cycle is subsequent to said third clock cycle; and
fourth program code for providing a valid signal, coupled to said kill queue, generated during the second clock cycle for indicating whether the instruction is to be executed by the microprocessor, wherein said valid signal is false if said kill signal value output by said kill queue during the second clock cycle is true.

* * * * *